United States Patent [19]

Sainio et al.

[11] Patent Number: 5,689,425
[45] Date of Patent: Nov. 18, 1997

[54] COLOR REGISTRATION SYSTEM FOR A PRINTING PRESS

[75] Inventors: Jeffrey W. Sainio, Glendale; John C. Seymour, Jefferson; Jeffrey Paul Rappette, Waukesha; Chia-Lin Chu, Brookfield, all of Wis.

[73] Assignee: Quad/Tech, Inc., Sussex, Wis.

[21] Appl. No.: 429,910

[22] Filed: Apr. 27, 1995

Related U.S. Application Data

[63] Continuation-in-part of Ser. No. 967,978, Oct. 28, 1992, Pat. No. 5,412,577.

[51] Int. Cl.$^6$ .................................................. G06F 19/00
[52] U.S. Cl. ........................... 364/469.03; 250/559.39; 101/181
[58] Field of Search .................... 364/469.03, 469.04, 364559; 250/559.07, 559.3; 101/181, 486; 382/151, 278, 294

[56] References Cited

U.S. PATENT DOCUMENTS

| | | | |
|---|---|---|---|
| 3,114,797 | 12/1963 | Williams | 178/6.8 |
| 3,339,817 | 9/1967 | French | 226/100 |
| 3,915,090 | 10/1975 | Horst et al. | 101/426 |
| 4,232,336 | 11/1980 | Henry | 358/106 |
| 4,278,893 | 7/1981 | Kato et al. | 250/348 |
| 4,318,287 | 3/1982 | Stratton et al. | 364/469 |
| 4,428,287 | 1/1984 | Greiner | 101/170 |
| 4,437,403 | 3/1984 | Greiner | 101/248 |
| 4,528,630 | 7/1985 | Sargent | 364/469 |
| 4,532,596 | 7/1985 | Pugsley | 364/469 |
| 4,534,288 | 8/1985 | Brovman | 101/211 |
| 4,546,700 | 10/1985 | Kishner et al. | 101/211 |
| 4,552,608 | 11/1985 | Hoffmann et al. | 156/351 |
| 4,561,103 | 12/1985 | Horiguchi et al. | 382/1 |
| 4,569,584 | 2/1986 | St. John et al. | 355/14 P |
| 4,578,590 | 3/1986 | Wu | 250/548 |
| 4,582,768 | 4/1986 | Takeuchi et al. | 430/22 |
| 4,655,135 | 4/1987 | Brovman | 101/425 |
| 4,656,941 | 4/1987 | Brovman | 101/483 |
| 4,690,051 | 9/1987 | Kishine et al. | 101/211 |
| 4,719,575 | 1/1988 | Gnuechtel | 364/469 |
| 4,736,680 | 4/1988 | Wales et al. | 101/426 |
| 4,752,892 | 6/1988 | Lecha | 364/518 |
| 4,758,886 | 7/1988 | Rylander | 358/534 |
| 4,794,453 | 12/1988 | Gnuechtel et al. | 358/101 |
| 4,849,914 | 7/1989 | Medioni et al. | 364/526 |
| 4,860,650 | 8/1989 | Houser | 101/211 |
| 4,887,530 | 12/1989 | Sainio | 101/181 |
| 4,899,653 | 2/1990 | Michl et al. | 101/148 |
| 4,913,049 | 4/1990 | Sainio | 101/211 |
| 4,918,622 | 4/1990 | Granger et al. | 364/518 |
| 5,018,213 | 5/1991 | Sikes | 382/8 |
| 5,027,706 | 7/1991 | Niemiro et al. | 101/355 |
| 5,076,163 | 12/1991 | Sainio | 101/181 |
| 5,079,738 | 1/1992 | Bockenfeld | 395/800 |
| 5,113,252 | 5/1992 | Horie et al. | 358/77 |
| 5,119,132 | 6/1992 | Butler | 355/208 |
| 5,179,641 | 1/1993 | Comins et al. | 395/132 |
| 5,181,257 | 1/1993 | Steiner et al. | 382/17 |
| 5,313,570 | 5/1994 | Dermer et al. | 395/133 X |
| 5,359,513 | 10/1994 | Kano et al. | 382/130 |
| 5,412,577 | 5/1995 | Sainio et al. | 101/181 |

FOREIGN PATENT DOCUMENTS 723320  12/1965  Canada .

OTHER PUBLICATIONS

"Digital Signal Processing", William K. Pratt, pp. 196–203; 1991.

Primary Examiner—Joseph Ruggiero
Attorney, Agent, or Firm—Michael, Best & Friedrich

[57] ABSTRACT

A control system is disclosed for controlling misregistration between the colors of an image printed on a web. The system includes an imaging device such as a camera or group of cameras, a processor, and image conversion circuits coupled to the processor. The system detects print color misregistration based upon the signals produced by the imaging device as a result of scanning the printed image. The conversion circuits convert the signals to signals usable by the processor to determine the color densities of the various colors within the image. These on-press color densities are compared with reference color densities stored in a memory of the processor, wherein the reference color densities may be generated from a source such as the printing plates used to print the image for which misregistration is being monitored. Based upon the phase correlation of the on-press images with the reference images, a processor operates to produce registration offset values between the printed colors and controls a print controller which adjusts the print units such that the colors of the printed image are placed into registration.

61 Claims, 24 Drawing Sheets

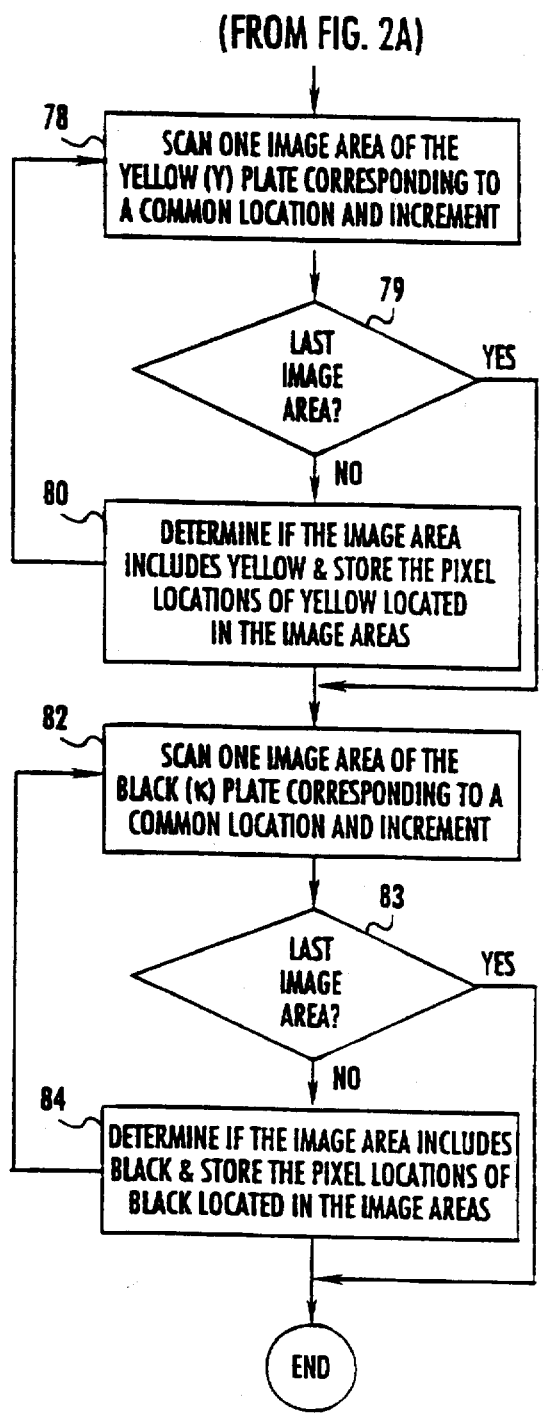
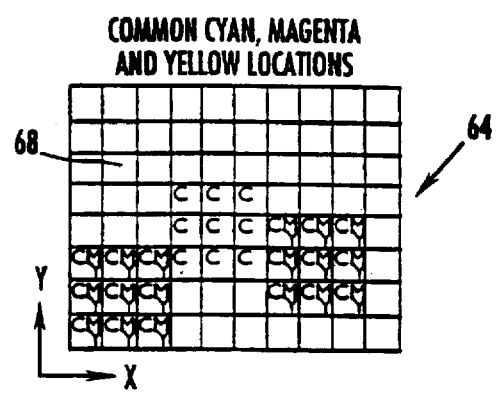
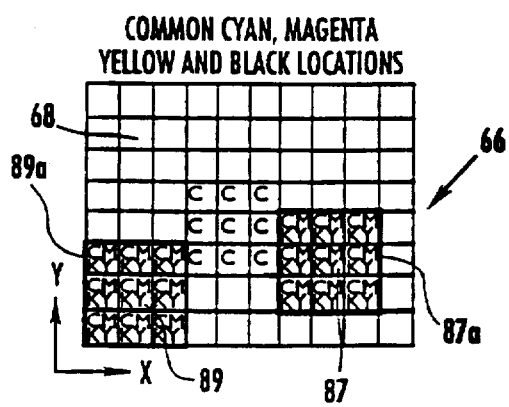
FIG. 2C
FIG. 2D

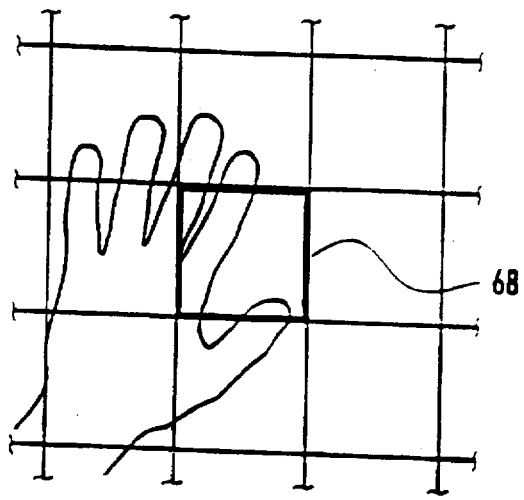
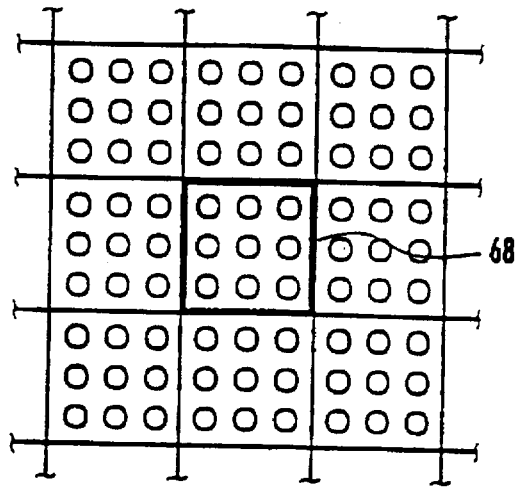
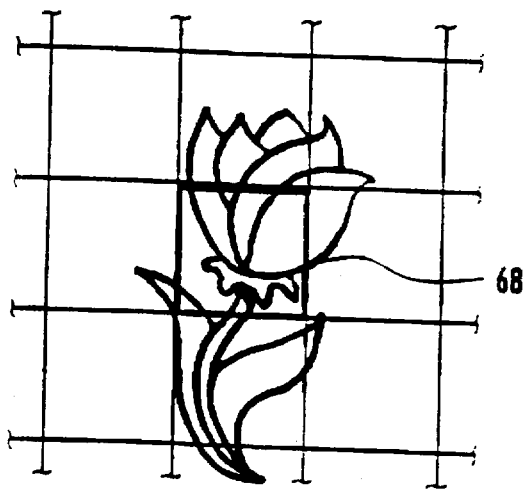
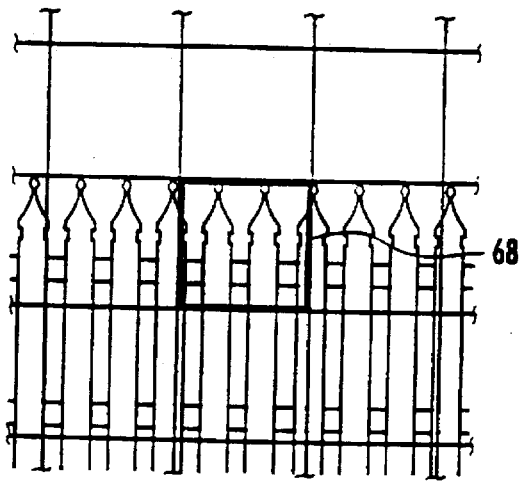
FIG. 2E
FIG. 2F

COLOR REGISTRATION SYSTEM FOR A PRINTING PRESS

CROSS-REFERENCE TO RELATED APPLICATIONS

The present application is a continuation-in-part of application Ser. No. 07/967,978 filed on Oct. 28, 1992 now U.S. Pat. No. 5,412,577 and assigned to a common owner entitled "Color Registration System for a Printing Press."

FIELD OF THE INVENTION

The present invention relates to a system for monitoring a multi-color printing press and generating signals representative of misregistration between the colors. More particularly, the present invention relates to a system for monitoring and controlling registration based upon data produced by scanning a portion of the printed image.

BACKGROUND OF THE INVENTION

U.S. Pat. No. 4,887,530, issued to Jeffrey W. Sainio on Dec. 19, 1989, discloses a control system for adjusting the color-to-color registration of multi-color web-fed printing press systems. In general, the device utilizes a registration mark distinct from the printed image to provide color-to-color registration. An optical scanner scans registration marks each associated with one color of the printed image. The optical scanner provides information to a control system which allows the control system to determine the spatial relationship of the registration marks and control the printing units of the printing press system such that the registration of printed colors is corrected as necessary.

The system of U.S. Pat. No. 4,887,530 is reliable and has proven highly useful for maintaining color-to-color registration of multi-color prints. However, the requirement of a registration mark distinct from the image being printed requires additional paper which is discarded and adds cost to the printing process. Additionally, there are certain types of printed materials which do not provide a convenient area for applying registration marks. Accordingly, it would be advantageous to provide a system which is able to provide color-to-color registration based only upon the image being printed.

U.S. Pat. No. 4,736,680, issued to R. Langdon Wales and H. W. Crowley on Apr. 12, 1988, discloses a register control system for use with a four-color printing press which utilizes a camera to scan a selected area of an image and locate a black dot in the image. In addition to locating the black dot, the system scans the area about the black dot to locate yellow, magenta, and cyan dots. Based upon the known relationship between the black dot, and the yellow, magenta and cyan dots, the system calculates correction values for the X and Y coordinates, which are simply the distance between the theoretical location of the dots and their electronically observed positions. The correction values are utilized a processor which applies correction values to the printing press to correct for misregistration.

Systems utilizing dots of a printed image to determine misregistration of the colors of a printed image suffer the problem of only being capable of providing registration for half-tone images. They are unable to provide registration for full-tone images. More specifically, in a half-tone image, dots exist since the image does not require printing upon 100% of the area of the web in the area where the image is printed. However, full-tone printing requires application of ink to 100% of the area within which the full-tone image is being printed. Accordingly, a full-tone image does not include dots which can be referenced to provide registration.

Accordingly, it would be advantageous to provide a color-to-color registration system capable of providing registration based upon a portion of a printed image including either half-tone or full-tone printing.

SUMMARY OF THE INVENTION

The present invention provides a system for generating a signal representative of color registration offset between at least first and second colors of an image printed on a web. The system includes a memory which stores a first reference array of digital data representative of the first color of at least a portion of the image and a second reference array of digital data representative of the second color of the portion. An imaging device is arranged in optical communication with the web to produce a first analog signal representative of the first color of the portion of the image and a second analog signal representative of the second color of the portion. The system also includes a converter circuit which is operatively associated with the imaging device and memory. This circuit converts the first analog signal to a first color array of digital data, and converts the second analog signal to a second color array of digital data. The first and second color arrays are then stored in the memory. A processing circuit in communication with the converter circuit and the memory is also provided in the system. The processing circuit phase correlates the first reference array with the first on-press array and phase correlates the second reference array with the second on-press array to determine a registration offset between the first and second colors and produce a signal representative of the registration offset between the colors.

The present invention further provides a system for generating a signal representative of color registration offset between cyan, magenta, yellow and black inks of an image printed on a web. The system includes a memory which stores first, second, third and fourth reference arrays of digital data representative of the cyan, magenta, yellow and black inks in at least a portion of the image. An imaging device in optical communication with the web produces first, second, third and fourth analog signals representative of the cyan, magenta, yellow and black inks in the portion of the image. The system also includes a converter circuit operatively associated with the imaging device which converts the first, second, third and fourth analog signals to cyan, magenta, yellow and black color arrays of digital data. A processing circuit in communication with the converter circuit and the memory is also provided. The processing circuit phase correlates the cyan, magenta, yellow and black reference arrays with cyan, magenta, yellow and black on-press arrays to determine registration offsets between the cyan, magenta, yellow and black inks.

The present invention further provides a system for generating a signal representative of color registration rotational offset between at least first and second colors of an image printed on a web. The system includes a memory disposed to store a first reference array of digital data representative of at least first and second portions of the image and a second reference array of digital data representative of the first and second portions. The first portion is displaced from the second portion. An imaging device in optical communication with the web produces a first analog signal representative of the first color of the portion and a second analog signal representative of the second color of the portion. The system also includes a converter circuit operatively associated with the imaging device and memory. The circuit converts the first analog signal to a first color array of digital data, and converts the second analog signal to a second color array of digital data. A processing circuit in communication with the converter circuit and the memory is also provided in the system. The processing circuit phase correlates the first reference array with the first on-press array and phase correlates the second reference array with the second on-press array to determine registration offsets between the first and second colors at the first and second portions, and produces a signal representative the rotational offset between the colors based upon the first and second offsets.

The invention still further provides a system for generating a first reference array of digital data and a second reference array of digital data. A printing apparatus prints an image on at least a portion of a web which includes a first printing unit which applies a first color of the image on the portion of the web and a second printing unit which applies a second color of the image on the portion of the web after the first color has been applied. The system includes a print controller coupled to the first and second printing units and configured to have the first printing unit apply the first color then the second printing unit apply the second color. The system also includes a memory which stores the first and second reference arrays of digital data representative of the first and second colors. An imaging system is in optical communication with the web and is configured to produce data representative of the first and second inks. A converter circuit is operatively associated with the imaging device and memory and converts the first analog signal to the first reference array of digital data and converts the second analog signal to the second reference array of digital data.

The invention still further provides a system for generating cyan, magenta, yellow and black reference arrays wherein cyan, magenta, yellow and black printing units are disposed to print cyan, magenta, yellow and black inks, respectively, on a web. The system includes a print controller coupled to the printing units and configured to have the printing units first print a first reference area of the image in yellow ink, next print a second reference area of the image in magenta ink, next print a third reference area of the image in cyan ink, and next print a fourth reference area of the image in black ink. The system also includes a memory which stores the first, second, third and fourth reference arrays of digital data representative of the yellow, magenta, cyan and black inks, respectively, in the first, second, third and fourth reference images. A camera assembly is in optical communication with the web and configured to produce data representative of the yellow, magenta, cyan and black inks.

BRIEF DESCRIPTION OF THE DRAWINGS

A preferred embodiment of the present invention will hereinafter be described in conjunction with the appended drawings, where:

FIG. 2C is a continuation of the flow chart in FIG. 2A for determining color locations in printing plates;

FIG. 2D is a continuation of the scan grids in FIG. 2B made up of image scan areas;

FIG. 2E illustrates color shapes within scan areas suitable for registration;

FIG. 2F illustrates color shapes within scan areas which are generally unsuitable for registration;

FIG. 8A illustrates an exploded view of the location of the maximum cross correlation value relative to the y axis;

FIG. 9A illustrates an exploded view of the location of the maximum cross correlation value relative to the x axis;

DETAILED DESCRIPTION OF A PREFERRED EMBODIMENT

Figure 1:
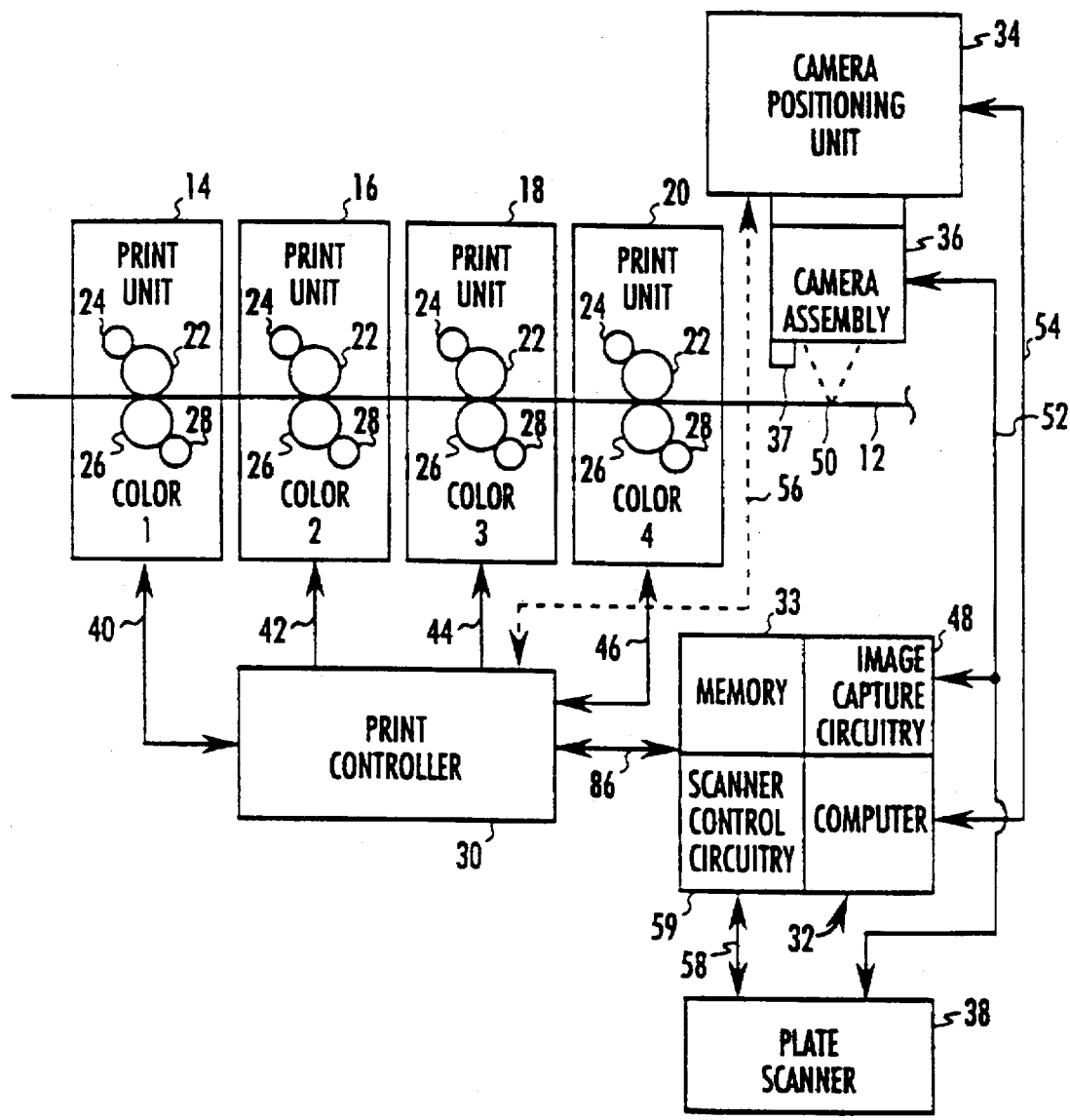
FIG. 1 is a block diagram of a printing system in accordance with the present invention.

Referring now to FIG. 1, a printing system 10 for printing a multi-color image upon a web 12 is illustrated. In the presently preferred embodiment, four printing units 14, 16, 18 and 20 each print one color of the image upon web 12. This type of printing is commonly referred to as web offset printing. Each print unit 14, 16, 18 and 20 includes an upper blanket cylinder 22, an upper printing plate cylinder 24, a lower blanket cylinder 26, and a lower printing plate cylinder 28. In printing system 10, colors 1, 2, 3 and 4 on units 14, 16, 18 and 20, respectively, are black (K), cyan (C), magenta (M) and yellow (Y). The location of printing units 14, 16, 18 and 20 relative to each other is determined by the printer.

System 10 also includes a print controller 30, a computer 32, a camera positioning unit 34, a camera assembly 36, a printing plate scanner 38, and a non-invasive web stabilizer 39. Print controller 30 serves as the interface between computer 32 and printing units 14, 16, 18 and 20. Controller 30 is coupled to units 14, 16, 18 and 20 by data buses 40, 42, 44 and 46, respectively, and coupled to computer 32 by data bus 86. Controller 30 converts the signals from computer 32 into signals which are applied to units 14, 16, 18 and 20, and transmits signals representative of the speed and registration of units 14, 16, 18 and 20 to computer 32. The signals produced by controller 30 have the proper (conventional) protocol to precisely control longitudinal, lateral and rotational positioning of cylinders 22, 24, 26 and 28 relative to moving web 12 such that the colors printed by units 14, 16, 18 and 20 are registered to produce a multi-color image having suitable quality.

Non-invasive web stabilizer 39 does not make physical contact with web 12. Scanning can be advantageously effected in the vicinity of print units 14, 16, 18, and 20 without smearing the ink. In view of the proximity of the scanners to the printing units, not only are long time delays between printing and detection of misregistration substantially eliminated, but web weave is minimized. Stabilizer 39 can be any mechanism which dampens the flutter of web 12 to within acceptable limits for scanning, without causing the image imprinted on the respective surfaces of web 12 to smear. For example, stabilizer 39 may provide respective forced-air conduits, disposed on either side of web 12, including apertures to generate respective oppositely directed air streams impinging on both the upper and lower surface of web 12 with sufficient force to stabilize the web. In accordance with the preferred embodiment, stabilizer 39 employs a Bernoulli-effect to stabilize web 12 as further disclosed in U.S. Pat. No. 4,913,049 issued Apr. 3, 1990.

Computer 32 may be of the conventional type including a 486 microprocessor and PC architecture. Computer 32 includes random access memory 33 (semiconductor memory and/or disk drive storage) and image capture circuitry 48 which interfaces with camera assembly 36 and plate scanner 38. Circuitry 48 includes four image capture boards which are connected to the expansion bus of computer 32. By way of example, the image capture boards may be of the bus board type manufactured by Matrox as Model No. PIP512.

In the present embodiment, camera assembly 36 includes a single properly configured 4-CCD color camera having red (R), green (G), blue (B) and infrared (I) outputs focused at the same position 50 of printed web 12. Each one of the four channels of camera assembly 36 is coupled to one of the four image capture boards via a signal bus 52. The four channels of camera assembly 36 are configured to scan web 12 for red (R), green (G), blue (B) and infrared (I) colors.

By way of modification, four black and white cameras having CCD imagers of the type manufactured by Sony as Model XC57 may be substituted for 4-CCD color camera of assembly 36. Each black and white camera may include a different filter for scanning the printed image at location 50. Accordingly, the first camera is fitted with a red filter, the second camera is fitted with a green filter, the third camera is fitted with a blue filter and the fourth camera is fitted with an infrared filter. By way of example only, the filters may be of the type manufactured by Oriel Corporation of Stratford, Conn., where the red filter is Model No. 57610, the green filter is Model No. 57570, the blue filter is Model No. 57530 and the infrared filter is Model No. 57690.

By way of further modification, it is contemplated a modified split channel 3-CCD color camera could also be substituted for 4-CCD color camera of assembly 36. The infrared-cut filter of a standard 3-CCD RGB camera could be removed and a custom filter could be placed before the red CCD. By way of example, the red CCD filter may be modified to allow only red light to pass through on the left side of the filter and only infrared light to pass through on the right side of the filter. Therefore, the modified 3-CCD camera would function as a RGB camera on the left side and an IGB camera on the right side. Additionally, it is contemplated that cameras having imagers other than CCDs (e.g., MOS imagers) may be used, depending upon the requirements of a particular application.

Signal bus 52 transmits image data from camera assembly 36 to image capture circuitry 48, and camera control data from circuitry 48 to camera assembly 36. Circuitry 48 includes video memory which is configured to store image data corresponding to one image scan of assembly 36. Camera assembly 36 also includes a light or strobe light assembly 37 which is coupled to computer 32 by signal bus 52.

Computer 32 is also connected to camera positioning unit 34 by data bus 54. Camera positioning unit 34 permits lateral (X axis) and circumferential (Y axis) movement of assembly 36 relative to web 12. Assembly 36 is mechanically coupled to unit 34, and unit 34 permits movement of camera 36 relative to web 12, either laterally (X direction) or circumferentially (Y direction). The purpose of positioning assembly 36 is to allow selective scanning of portions of a printed image which are suitable for registration (discussed below). By way of modification, unit 34 may be coupled to print unit controller 30 by a data bus 56 which allows computer 32 to control the location of unit 34 via controller 30, where controller 30 provides circuitry necessary to interface unit 34 with computer 32. When web 12 is moving, circumferential (Y) positioning by unit 34 is not necessary since the timing of the strobe light to freeze the motion or a high speed shutter effectively provides circumferential positioning relative to moving web 12.

Plate scanner 38 may be an X, Y flatbed scanner including a black and white camera having a CCD imager of the type manufactured by Sony as Model NO. XC57. The camera of scanner 38 is coupled to one of the image capture boards of image capture circuitry 48 by data bus 52 and coupled to scanner control circuitry 59 of computer 32 by data bus 58. Circuitry 59 may be the circuitry of computer 32 normally used to control a printer via a parallel or serial port of computer 32. Scanner 38 operates to scan each printing plate associated with the printing of a particular printed image and determine the location(s) in the image at which colors (C, M, Y, K) of the image are being printed (described in detail below).

The general operation of system 10 will now be discussed in conjunction with FIG. 1. The first step of the printing process for a given image on web 12 is to individually scan the color 1 (cyan), color 2 (magenta), color 3 (yellow) and color 4 (black) printing plates. To scan each of the printing plates, the camera of scanner 38 is moved in the X and Y directions to view a plurality of image scan areas 68 of the plates which correspond in size to the scan area of the camera. Depending upon the printing press and plate size, the number of image scan areas 68 may vary. In the present example, each printing plate includes eight image scan areas 68 in the Y direction and ten image scan areas 68 in the X direction (80 total image scan areas). The purpose of providing plate scanning is to determine portions (reference areas) of the printed image produced by the C, M, Y and K printing plates which include all of the colors being printed (i.e., C, M, Y and K) where the colors have shapes within the portion which are suitable for registration (discussed below). However, in some situations, a single reference area including all four colors and suitable for registration will not be found in one image scan area 68 of a printed image. In these situations, more than one reference area must be established, where the reference areas have at least one common color.

By way of modification, if the printing plates are produced by a system based upon digital data, a scanner 38 would not be required since the digital data used to produce the plates could be used to directly establish the reference areas of a printed image. Additionally, scanner 38 could be a conventional flatbed scanner which is not required to interface with image capture circuits 94, 96, 98 and 100.

Figure 2A:
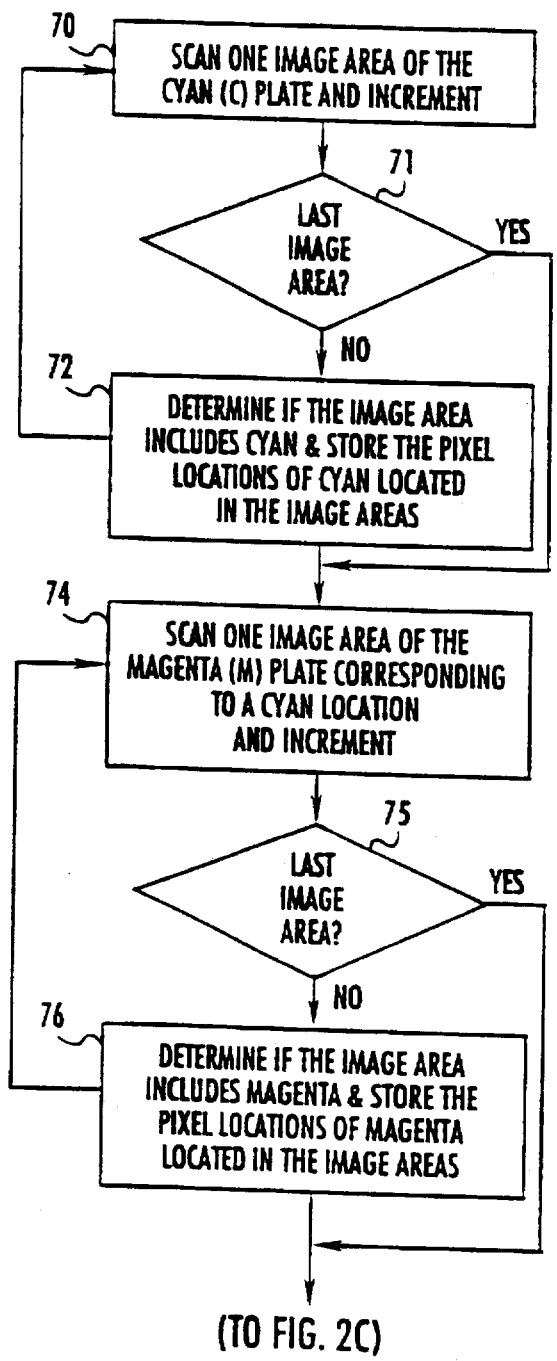
FIG. 2A is a flow chart for the process of determining color locations in printing plates.

FIGS. 2A, 2B, 2C and 2D illustrate the presently preferred embodiment of determining the reference areas of a printed image. In step 70, computer 32 applies control signals to scanner 38 via bus 58 such that each image scan area 68 is scanned by the camera of scanner 38. During scanning, the camera of scanner 38 transmits analog signals representative of the printing plate image in each image scan area. Referring to FIGS. 2A and 2C, a scan grid 60 of areas 68 having the dimensions of a printing plate is shown. Areas 68 having the cyan color with a shape suitable for registration ("registrable" color) are marked with a "C". An area 68 is suitable for registration if the color within the area is distributed in such a way that it provides sufficient information to provide reliable registration. Characteristics of the shape of a color which provides an area 68 suitable for registration include: 1) edges which are non-linear; 2) patterns which do not repeat within the area 68; 3) edges which are discontinuous; or 4) multiple edges, linear or non-linear, at different orientations. The purpose of picking an area 68 which is suitable for registration is to register based upon a color shape which is distinct from shapes of that color in adjacent areas 68. FIG. 2E illustrates examples of color shapes within areas 68 which are suitable for registration. FIG. 2F illustrates examples of color shapes which may not be suitable for registration.

In step 72, computer 32 determines if the scanned area 68 includes registrable cyan and stores the locations of areas 68 including registrable cyan, and the pixel locations of registrable cyan within each area 68. Step 71 allows computer 32 to control scanner 38 such that areas 68 are scanned incrementally until the last area is scanned.

Steps 74, 75 and 76, 78, 79 and 80, and 82, 83 and 84 are the same as steps 70, 71 and 72, respectively, with the exception that steps 74 and 76, 78 and 80, and 82 and 84 are performed for the magenta, yellow and black printing plates, respectively. Additionally, steps 74, 75 and 76 are only performed for areas 68 which include registrable cyan, steps 78, 79 and 80 are only performed for areas 68 which include registrable cyan and magenta, and steps 82, 83 and 84 are only performed for areas 68 including registrable cyan, magenta and yellow.

Figure 2B:
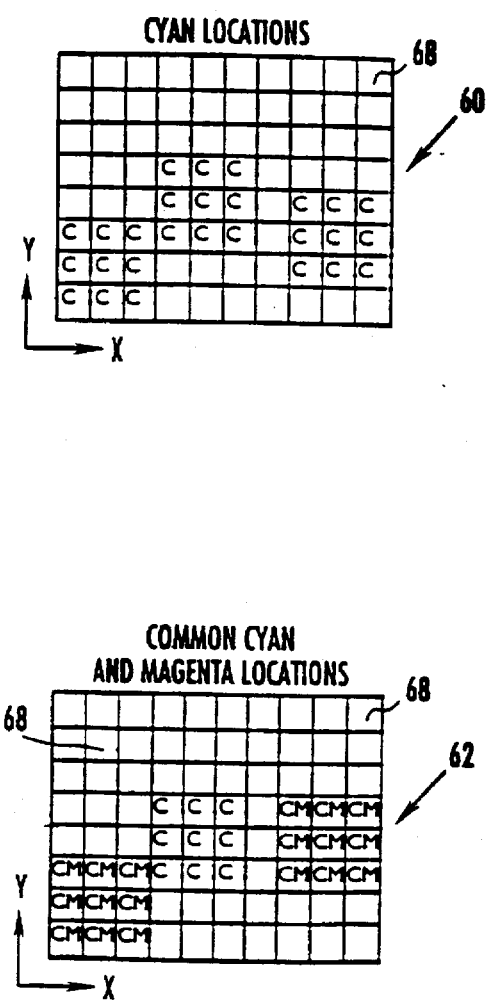
FIG. 2B illustrates scan grids made up of image scan areas.

Referring to FIGS. 2B and 2D, areas 68 including registrable cyan and magenta are marked with "CM" in scan grid 62, areas 68 including registrable cyan, magenta and yellow are marked with "CMY" in scan grid 64, and areas 68 including all four registrable colors are marked with "CMYK" in scan grid 66. This process of scanning the printing plates reduces scanning and computer time by reducing the number of areas 68 scanned necessary to determine the reference areas. More specifically, for this exemplary set of printing plates, only 143 (80+27+18+18) areas 68 were scanned instead of scanning 320 (80+80+80+80) areas 68.

The preceding description regarding FIGS. 2A, 2B, 2C and 2D concerns an exemplary set of CMYK plates. However, printing plate sizes and color locations will change according to the colors of the printed image produced by the plates. Additionally, as discussed above, some printed images may not include all four colors having shapes suitable for registration in one image scan area 68. Thus, the process of scanning the printing plates requires that computer 32 store color distribution data for separate image scan areas 68 (reference areas) where the reference areas both include at least one common color having a shape suitable for registration, and the combination of the reference areas include all of the colors used to print the image. For example, registrable black, yellow and magenta may not simultaneously be present in any of image areas 68. In this situation, the selected reference areas would all include registrable cyan, and the combination of the reference areas would include registrable cyan, magenta, yellow and black.

Of course, depending upon the hardware and software chosen, it may not be necessary to optimize the scanning process in the above-described manner since this process is typically only performed once for the printing of a given image by system 10. Additionally, camera technology may develop to the point where economically practical cameras have enough resolution to increase the size of image scan areas 68.

By way of modification, it is also contemplated the use of pre-press image data, which forces the use of either plate scanner 38 or a digital plate scanner, could be eliminated by digitally forming reference images directly from films, proofs or digital pre-press data.

For example, referring again to FIG. 1, registration templates can be formed directly from web 12 by applying each of the inks of printing units 14 (black), 16 (cyan), 18 (magenta) and 20 (yellow) onto web 12 in a given order. The ordering of the ink application sequence is controlled by computer 32 which is configured to operate as a sequential ink turn-on circuit.

Camera assembly 36 is positioned by camera positioning unit 34 to the region of interest for registration which is established based on the referencing criteria previously described in conjunction with FIGS. 2A, 2B, 2C and 2D. After signals representing the coordinates of the referencing area are applied from computer 32 to data bus 54, camera assembly 36 is focused at the same position 50 of web 12.

Print controller 30 converts signals from computer 32 to begin applying ink onto web 12 into signals which are applied to print units 14, 16, 18 and 20. By way of example, print controller 30 applies a signal to print unit 20 via bus 40 to apply yellow ink onto web 12. After camera assembly 36 flashes strobe 37 synchronously with web 12 such that a picture of reference area 50 is taken while the press is running, a yellow reference image is formed from the blue channel of 4-CCD camera of assembly 36. The blue channel of camera assembly 36 primarily detects yellow and black images.

A second signal is then applied by print controller 30 to print unit 18 via bus 42 to apply magenta ink to web 12. Again, camera assembly 36 takes a picture of web 12 containing yellow and magenta images, and a magenta reference image is formed from the green channel of 4-CCD camera of assembly 36. The green channel of camera assembly 36 primarily detects magenta and black images.

A third signal is then applied by print controller 30 to print unit 16 via bus 44 to apply cyan ink to web 12 and camera assembly 36 takes a picture of web 12 which now contains yellow, magenta and cyan images. A cyan reference image is formed from the red channel of 4-CCD camera of assembly 36. The red channel of camera assembly 36 primarily detects cyan and black images. Finally, a fourth signal is applied by print controller 30 to print unit 14 via bus 46 to apply black ink to web 12. Camera assembly 36 takes a picture of web 12 now containing all four inks and a black reference image is formed from the infrared channel of 4-CCD camera of assembly 36. The infrared channel of camera assembly 36 primarily detects black images.

These four images represent nearly perfect color separation because the ordering of the printing of the CYMK inks on web 12 minimizes the contamination of unwanted inks into the red, green, blue and infrared channels of 4-CCD camera of assembly 36. Yellow ink is preferably printed first because it has very little effect on the red, green and infrared channels of 4-CCD camera of assembly 36. Magenta ink is printed next because it has little effect on the red and infrared channels, and the green channel would be easily contaminated by the cyan and black inks. Cyan ink is printed third because it does not affect the infrared channel and the red channel would be contaminated by black ink. Finally, black ink is printed last because all of the other reference images have been formed so there are no remaining channels to be contaminated, and the infrared channel is not contaminated by the cyan, magenta and yellow inks. In the preferred embodiment of the present invention, the order of the printing of the CYMK inks applied by computer 32 to web 12 depends on the spectral purity of the inks used to form the images.

Delays between any two inks are controlled by computer 32 and depend on how fast the inks can be spread uniformly across the web, and thus render clear enough pictures for on-press color-to-color registration. If the sequential ink reference images are out of register with each other, inter-color correlations can be used to accurately re-register the reference images (described below).

The presently preferred embodiment of cameras 92 and 93 (see FIGS. 4 and 5) used in camera assembly 36 and scanner 38 include imagers which provide a resolution of 512 pixels by 480 lines (512 pixels×480 pixels). A typical CCD imager provides approximately a 4:5 picture aspect ratio so that the field of vision of the imager is 1"×.8" instead of a 1"×1" square field of vision. By way of modification, future developments or different application requirements may make different pixel resolutions other than 512 pixels× 480 pixels preferable for cameras 92 and 93.

Figure 3A:
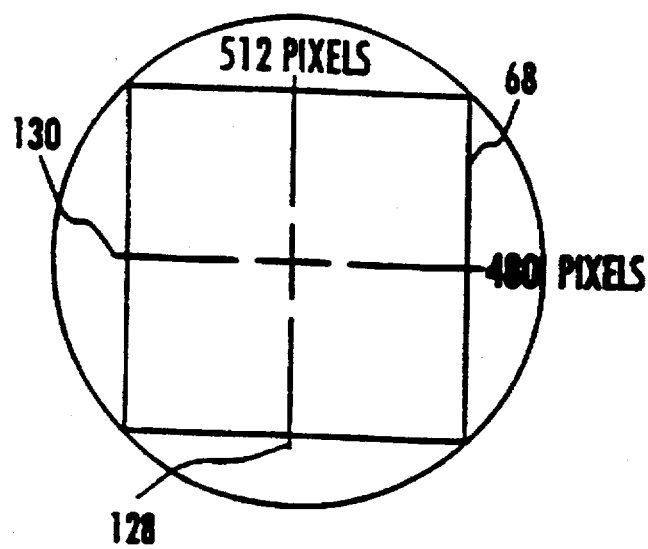
FIG. 3A illustrates an exploded view of an image scan area.

Referring to FIG. 3A, the presently preferred embodiment focuses the camera of assembly 36 and scanner 38 such that a 512 pixel×480 pixel image scan area 68 is viewed. Accordingly, the data provided to computer 32 by cameras 92 and 93 via image capture circuitry 48 has a resolution representative of 512 pixels along the X axis and 480 pixels along the Y axis. For each image scan area 68 scanned by a camera, the associated image capture board converts the analog camera signal into an 8-bit data word for each of the pixels from the image scan area 68, and stores a 512×512 array of data words for each image scan area 68. The last 32 rows of the 512×512 array are filled with the average pixel intensity of image scan area 68 so that the dimensions of the data array are equal for the reasons discussed below. In the preferred embodiment, each pixel in the 512×512 array contains 32 bits of information from each CCD (8 bits of red information, 8 bits of green information, 8 bits of blue information and 8 bits of infrared information).

Figure 3:
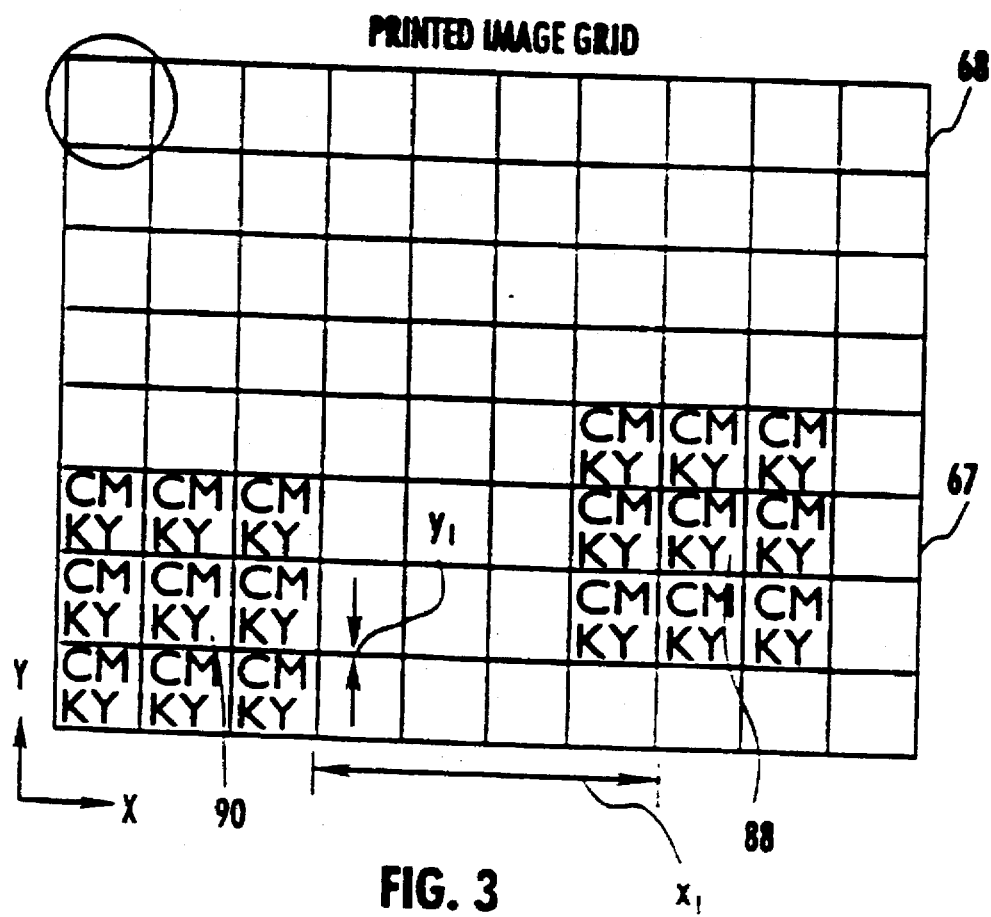
FIG. 3 illustrates the configuration of a scanning grid for a plate scanner.

In steps 72, 76, 80 and 84 (FIG. 2A), computer 32 stores data for each reference area (image scan areas including all colors printed in the image of interest which are registrable, or image scan areas 68 with the maximum number of registrable colors common to any area) at a resolution of 512 bytes along the X axis and 480 bytes along the Y axis. Referring to FIG. 3, computer 32 stores data representative of each reference area and the location of the reference area referenced to scan grid 67 (the printed image).

After the printing plates are scanned, the reference areas are established, and the data from the reference areas is stored, the plates are fastened to the plate cylinders 24 and 28 (where two-sided printing is performed). Computer 32 and print unit controller 30 transfer data over data bus 86, and computer 32 controls the times at which the camera of assembly 36 scans the printed image (which may include operating a strobe light 37) on web 12 (scan position). These times are based upon the rotational position of one of the blanket cylinders 22. Computer 32 controls the lateral position of assembly 36 by providing the appropriate signals to camera location unit 34 (Y scan position).

By way of modification, if reference images are formed directly from web 12 as previously described, there is no need to scan printing plates with plate scanner 38. The data from web 12 is directly communicated between computer 32 and print unit controller 30 over data bus 86.

During printing, X and Y printing scan positions are determined by computer 32 based upon the X and Y positions of the reference areas established during plate scanning, the rotational position and speed of one of the blanket cylinders 22, and the orientation of the printing plates on cylinders 24. By way of example, computer 32 may control unit 34 and assembly 36 to scan reference areas 88 and 90 of the printed image (FIG. 3). However, under certain conditions, a primary registration process (described in detail below) may be used to position assembly 36.

As discussed above, the printed image may be scanned during printing at one or more positions; however, the following description will be referenced to the scanning of the two reference areas 88 and 90. Each time a reference area 88 or 90 is scanned by camera assembly 36, the camera of assembly 36 applies analog image signals representative of the colors at the reference areas to the respective image capture boards of circuitry 48. Subsequently, the image capture boards convert the analog image signals to digital image data representative of the portion of the printed image in the reference area 88 or 90. Computer 32 then reads the digital image data from the capture boards and stores this data in memory 33.

The following is a description of the manner in which system 10 operates to compare the data produced from the reference areas of the printing plates during printing plate scanning (pre-press or reference image data) and the data produced by scanning the target areas of the printed image during printing (on-press image data), and uses this comparison to register the cyan, magenta, yellow and black printing plates.

Figure 4:
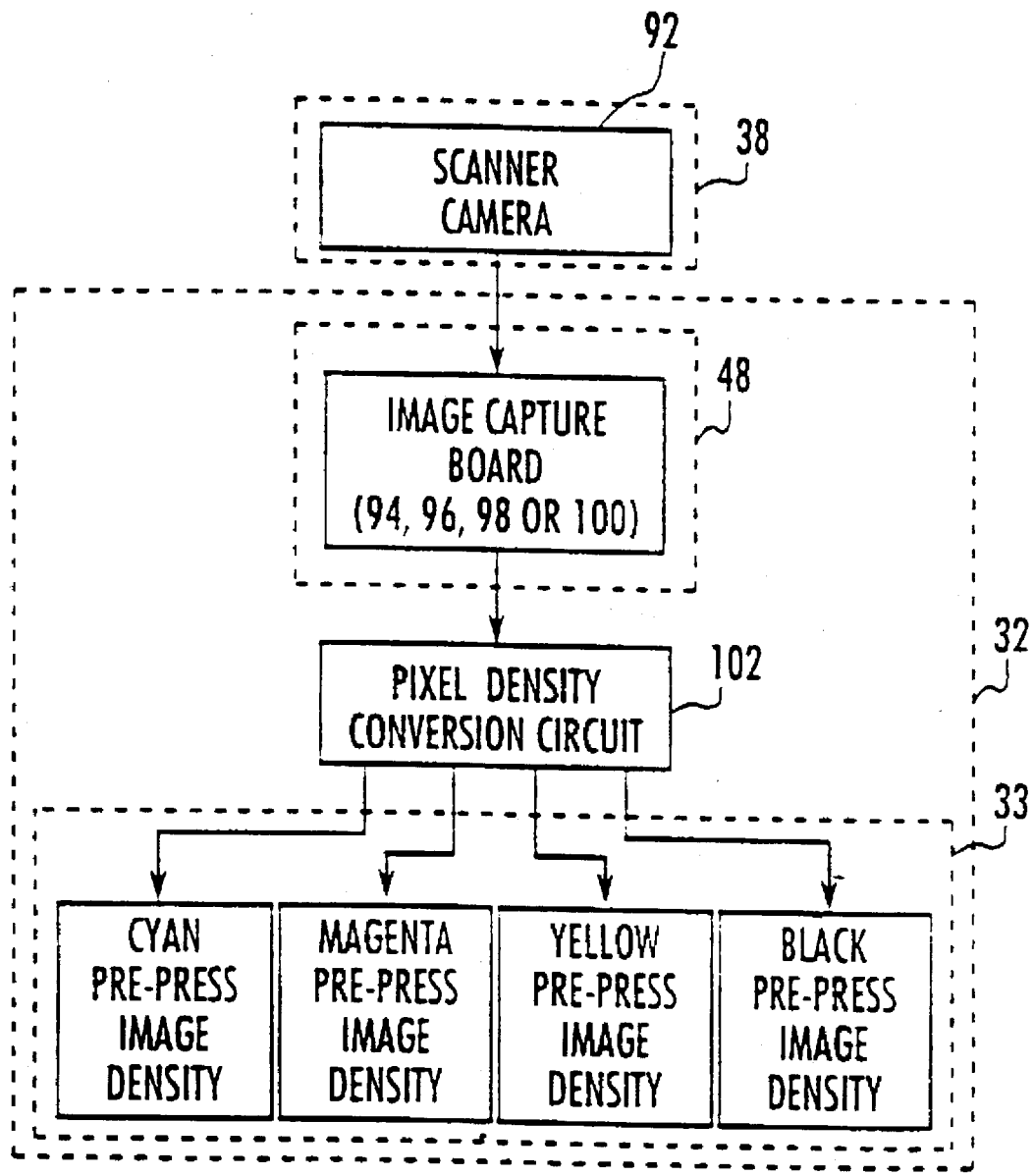
FIG. 4 is a block diagram of scanner camera conversion circuitry.

Before the pre-press and on-press image data is compared, the data is manipulated to provide a format more readily usable for comparison. Referring to FIG. 4, the analog image data from camera 92 of plate scanner 38 is converted to digital image data by one of capture boards 94, 96, 98, 100 of the image capture circuitry 48. This digital image data for each pixel of the camera is then converted to color density values by computer 32 which is programmed to operate as a pixel density conversion circuit 102.

Pixel density conversion is accomplished by calibrating camera 92 of plate scanner 38 for no light (black) and the light of the illumination reflecting from white paper, and then referencing the image data to the calibration values. Typically, the 8-bit digital image calibration value (K) for black (camera cap on) is between 0 and 10 (decimal) and the 8-bit digital image calibration value (W) for white is between 240 and 250 (decimal).

The following Equation 1 may be used to produce pixel density data (Dp) from the digital image data (P) for each pixel of a reference area.

$$Dp = -\log_{10}\left[\frac{P-K}{W-K}\right] \quad (1)$$

Alternatively, an analog circuit could be used to perform the pixel density conversions. More specifically, an analog circuit including white and black calibration reference voltages could be used to output the $\log_{10}$ of $$\left[\frac{P-K}{W-K}\right],$$

where P is the analog signal from the camera, to produce an analog signal representative of the pixel density. The converted analog signal would then be applied to the image capture board. Additionally, factors such as nonlinearity of the imager, non-uniform illumination, veiling glare in the lens, scattered light, non-uniform pixel sensitivity, the electronic response of the camera and digitizer, and other camera and lighting characteristics may require the use of a different function to produce pixel density data. Furthermore, depending upon the system, satisfactory results may be obtained without converting image color data to pixel density data. In this situation, the processes described below would use image color data in place of pixel density data, and the corresponding reference data would be configured accordingly.

After converting the digital image data for each color (RGBI) at each reference area, the corresponding pixel (image) density data is stored in memory 33.

Figure 5:
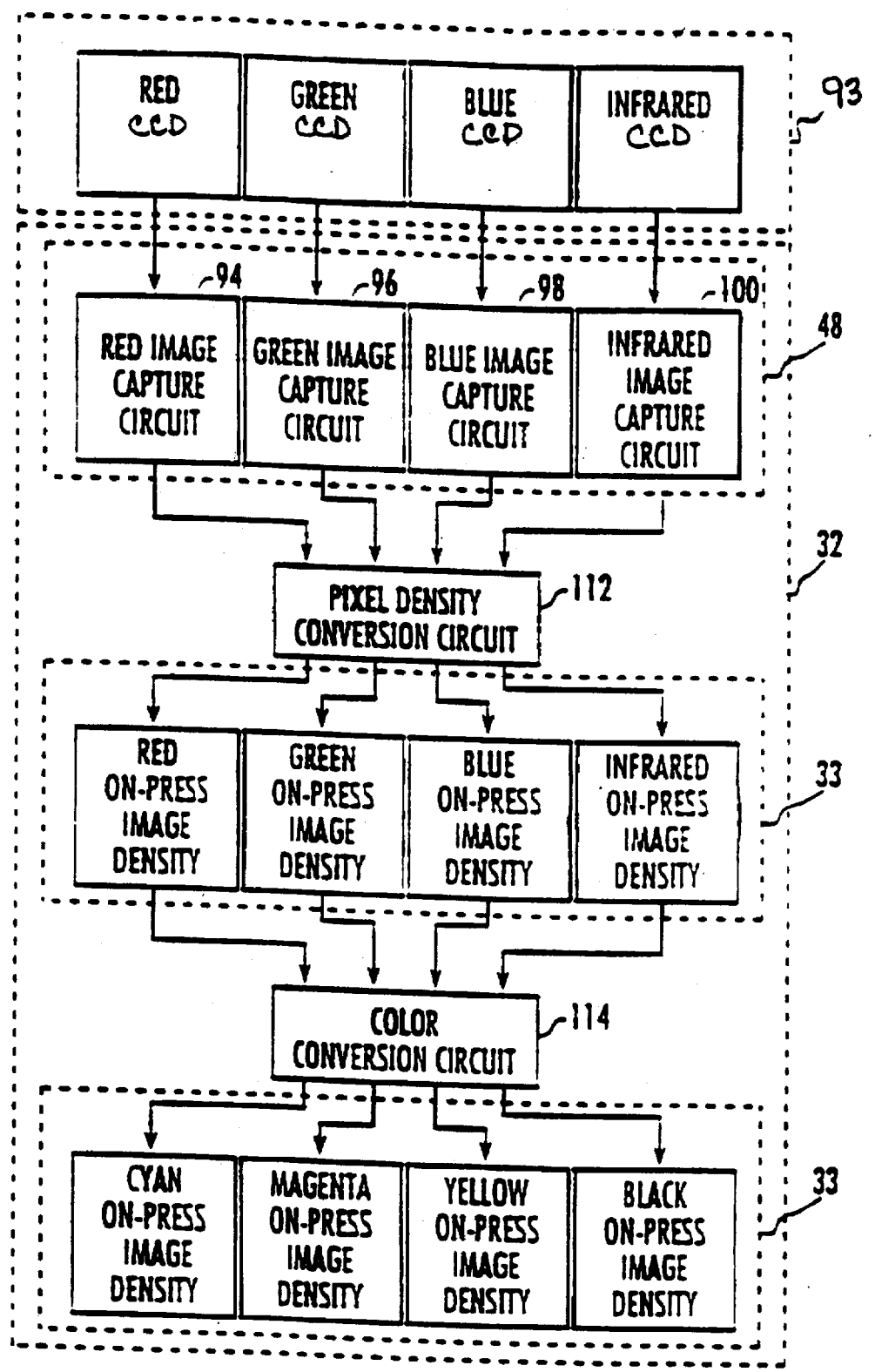
FIG. 5 is a block diagram of converting circuitry for a 4-channel RGBI image scanning camera.

Referring to FIG. 5, the analog image data from the red (R), green (U), blue (B) and infrared (I) channels of camera 93 of assembly 36 is converted to digital image data by the red, green, blue and infrared image capture circuits 94, 96, 98 and 100 of circuitry 48, respectively. Computer 32 converts the RGBI digital image data to RGBI image density data (on-press) in accordance with Equation 1 as discussed above, and stores this data in memory 33. (Each CCD of camera 93 is calibrated using cyan, magenta, yellow and black ink patches, and light level information from white paper and dark level information from a completely closed camera shutter depending on the camera.)

Subsequent to producing the RGBI on-press image density data, the RGBI density data is converted to CMYK on-press image density data by computer 32, which is programmed to operate as a color conversion circuit 114.

Computer 32 performs color conversion by multiplying the RGBI image density data vector for each pixel from reference areas 88 and 90 by a color separation matrix to produce a CMYK vector for each pixel. Each value in the color separation matrix depends upon the light at the CCDs of camera 93, the filter characteristics, the ink used for the printed image, and the characteristics of camera 93. Computer 32 stores the color separation matrix data in non-volatile memory since the data only changes if the above-referenced characteristics of the printing system are modified. Computer 32 stores the CMYK image density data in memory 33.

For example, considering the 4-CCD camera 93 of assembly 36 and inks that meet the standard for web offset printing (SWOP), the values of the separation matrix are:

$$\text{Color Separation Matrix} \quad \begin{array}{c} RGBI \\ \text{Vector} \end{array} \quad \begin{array}{c} CMYK \\ \text{Vector} \end{array}$$

$$\begin{bmatrix} 1.599 & -0.066 & 0.006 & -2.909 \\ -0.643 & 1.662 & -0.049 & -2.249 \\ 0.101 & 0.534 & 1.078 & -1.115 \\ -0.047 & -0.032 & -0.004 & 1.751 \end{bmatrix} \times \begin{bmatrix} R \\ G \\ B \\ I \end{bmatrix} = \begin{bmatrix} C \\ M \\ Y \\ K \end{bmatrix} \quad (2)$$

These values will vary as the above-listed variables are modified. For example, if a halogen bulb is used instead of a strode light, the matrix values would change.

In order to further improve the color separation values from RGBI to CMYK, respectively, "trim" filters may be mounted in front of the four CCDs of camera 93 which pass only the more optimum portion of the various color channels.

The trim filter is preferably a high-pass or low-pass filter which eliminates the unwanted portion of the spectrum. For example, the red channel of camera 93 is contaminated by the magenta ink in the higher frequency end of the spectrum, so a low-pass trim filter is mounted in front of the red CCD of camera 93 to eliminate, for example, the 600–650 nm range which provides an improved color separation. A high-pass trim filter is mounted in front of the green CCD of camera 93 to eliminate, for example, the 550–600 nm range because the green channel is badly contaminated in this range by cyan. The blue CCD of camera 93 is often contaminated by cyan below 440 nm. Thus, a low-pass filter using, for example, only the 450–490 nm range is mounted in front of the blue CCD of camera 93.

The above color separation technique is based on a model of ink density which assumes when one ink lies on another, the densities are additive (Beer's Law). By way of modification, other models (Neugebauer, Kubelka-Munk) which account for reflection from the ink surface, translucency of the ink or light scatter in the paper may be used to improve the accuracy of the color separation.

After multiplying the RGBI image density data vector for each pixel from references areas 88 and 90 by the color separation matrix (Equation 2), the CMYK images provide all of the necessary information for use with the markless registration system to determine register between the reference and on-press cyan, magenta, yellow, and black printed images.

As with the pixel density conversion described in reference to FIG. 4, the pixel density conversion in the arrangement of FIG. 5 could also be performed by an analog circuit before conversion of the analog image data to digital image data. Additionally, an analog circuit could be used to perform color conversion following analog density conversion.

Thus, the functions of computer 32 could be reduced to data handling and storage.

Figure 6A:
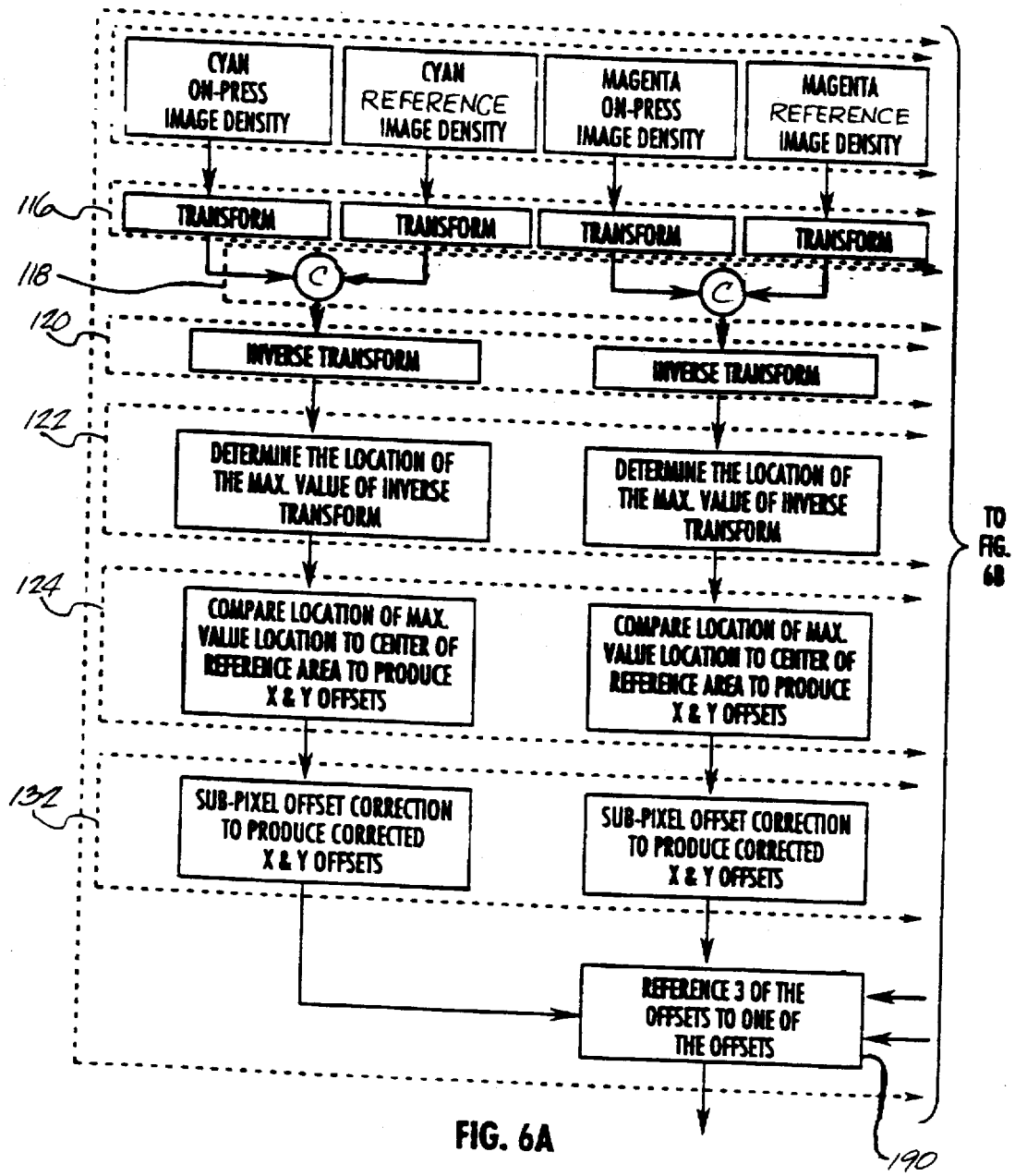
FIG. 6A is the left side of a data flow diagram illustrating the comparison of on-press image densities to reference image densities to produce color offset data.
Figure 6B:
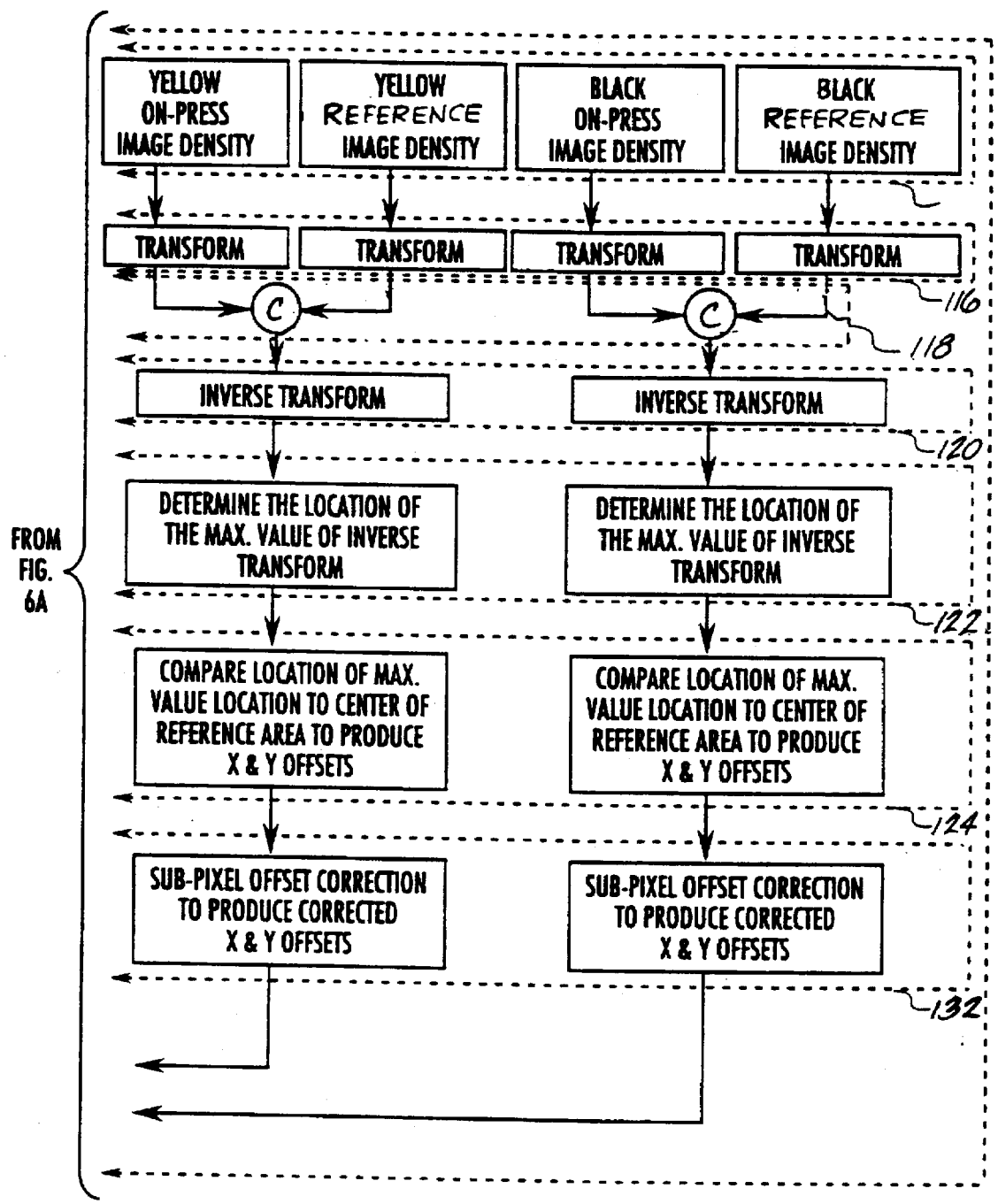
FIG. 6B is the right side of a data flow diagram illustrating the comparison of on-press image densities to reference image densities to produce color offset data.

Referring to FIGS. 6A and 6B, computer 32 is also programmed to operate as a circuit which performs two-dimensional cross correlations using Fourier transforms and inverse Fourier transforms. More specifically, computer 32 is programmed to perform fast Fourier transforms (FFTs) on the on-press and reference image density data. (See generally, E. Oran Bingham, "The Fast Fourier Transform," Prentice-Hall Inc., 1974 and William K. Pratt, "Digital Image Processing," 2nd Ed. John Wiley & Sons Inc., 1991, pp. 196–203.)

In general, computer 32 compares the CMYK image density data for the reference areas and the corresponding CMYK on-press image density data for the image scan areas 68 scanned by assembly 38. By way of example, in reference to grid 66 of FIG. 2B and grid 67 of FIG. 3, computer 32 compares the image density data from reference areas 87 and 89, and image scan areas 88 and 90 for each of CMYK to determine offsets between CMYK for these areas. To perform the comparisons, computer 32 is programmed to operate as a transform circuit 116, a correlation circuit 118, and an inverse transform circuit 120.

FFTs work on data arrays which have dimensions which are powers of two. Thus, the image density arrays are expanded from 512×480 to 512×512 (discussed above) by setting the bottom of the array to the average value of the upper portion of the array.

In the presently preferred embodiment, transform circuit 116 takes the fast Fourier transform (FFT) of the pre-press and on-press image density data for each color (CMYK) of the reference areas 87 and 89 and the printed image scan areas 88 and 90. Subsequently, correlation circuit 118 multiplies the complex conjugate of one of the FFTs of the pre-press or on-press image density data with the other of the FFTs of the pre-press or on-press image density data FFTs as follows in Equations 3–10:

$$\text{area } 87(C) \times \text{area } 88(C); \tag{3}$$

$$\text{area } 87(M) \times \text{area } 88(M); \tag{4}$$

$$\text{area } 87(Y) \times \text{area } 88(Y); \tag{5}$$

$$\text{area } 87(K) \times \text{area } 88(K); \tag{6}$$

$$\text{area } 89(C) \times \text{area } 90(C); \tag{7}$$

$$\text{area } 89(M) \times \text{area } 90(M); \tag{8}$$

$$\text{area } 89(Y) \times \text{area } 90(Y); \text{ and} \tag{9}$$

$$\text{area } 89(K) \times \text{area } 90(K). \tag{10}$$

The products of the transforms are stored in 512×512 (N×M) arrays.

Figure 7:
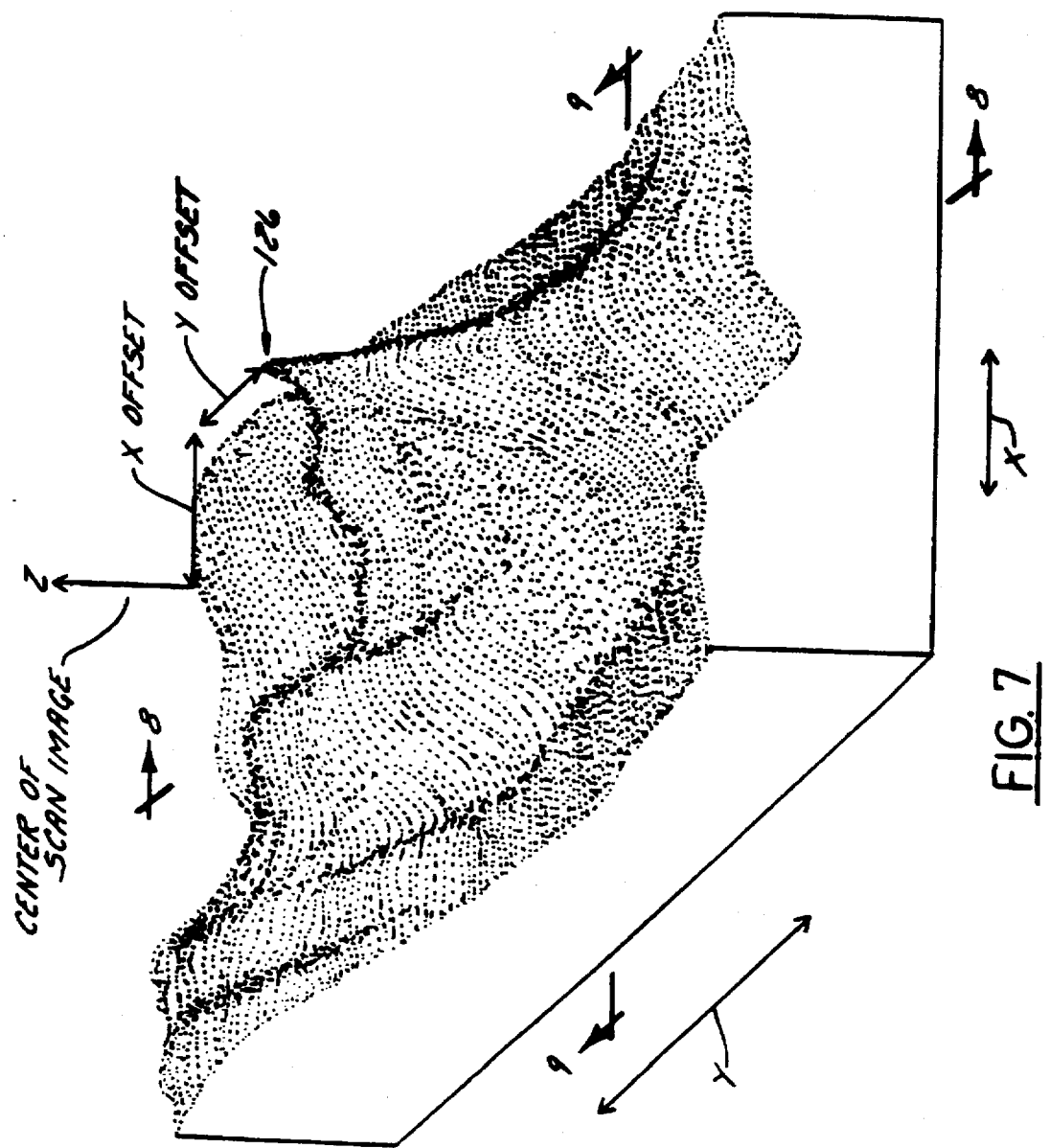
FIG. 7 is a three dimensional graph of inverse transform values of the product of the image intensity transforms for an on-press and reference image.

Inverse transform circuit 120 takes the two-dimensional inverse Fourier transforms of the products from Equations 3–10, after which the results of the inverse transforms are stored in memory 33. Referring to FIG. 7, a three-dimensional graph of a cross correlation is shown. ($X_i$ location=$N_i$*1 inch/512, $Y_j$ location=$M_j$*1 inch/512, Z location=product for $N_iM_j$). In particular, this is a graph of the cross correlation image density data for an on-press printed image scan area for one color and a reference area for that color.

Transform and inverse transform circuits 116 and 120 are not necessary to provide the products discussed above; however, transform and inverse transform circuits 116 and 120 increase the speed at which the cross correlation occurs by reducing the amount of multiplications required. As faster computers 32 become available, circuits 116 and 120 may become unnecessary.

Figure 8:
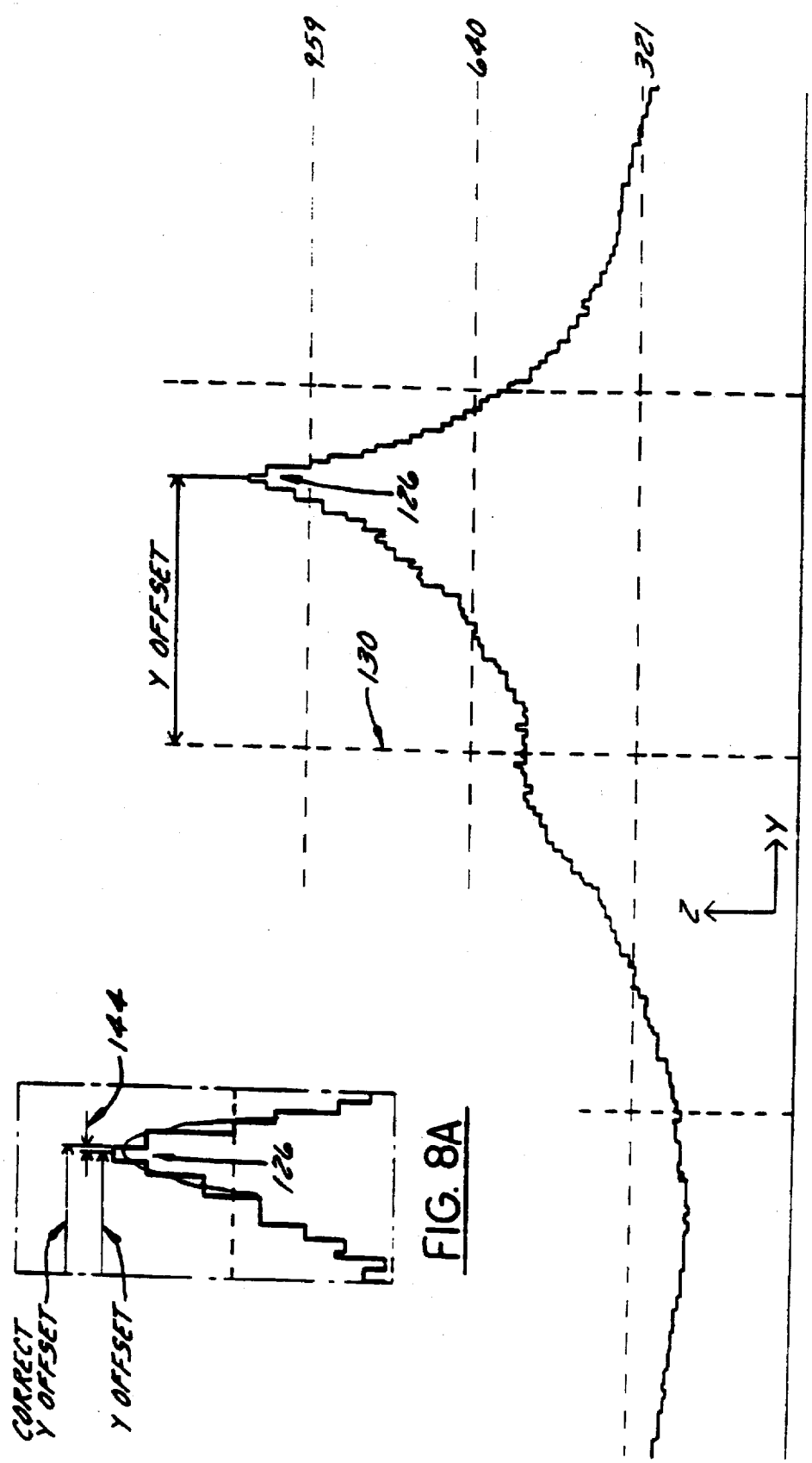
FIG. 8 is a sectional view of the three dimensional graph of FIG. 7 taken along section line 8—8.
Figure 9:
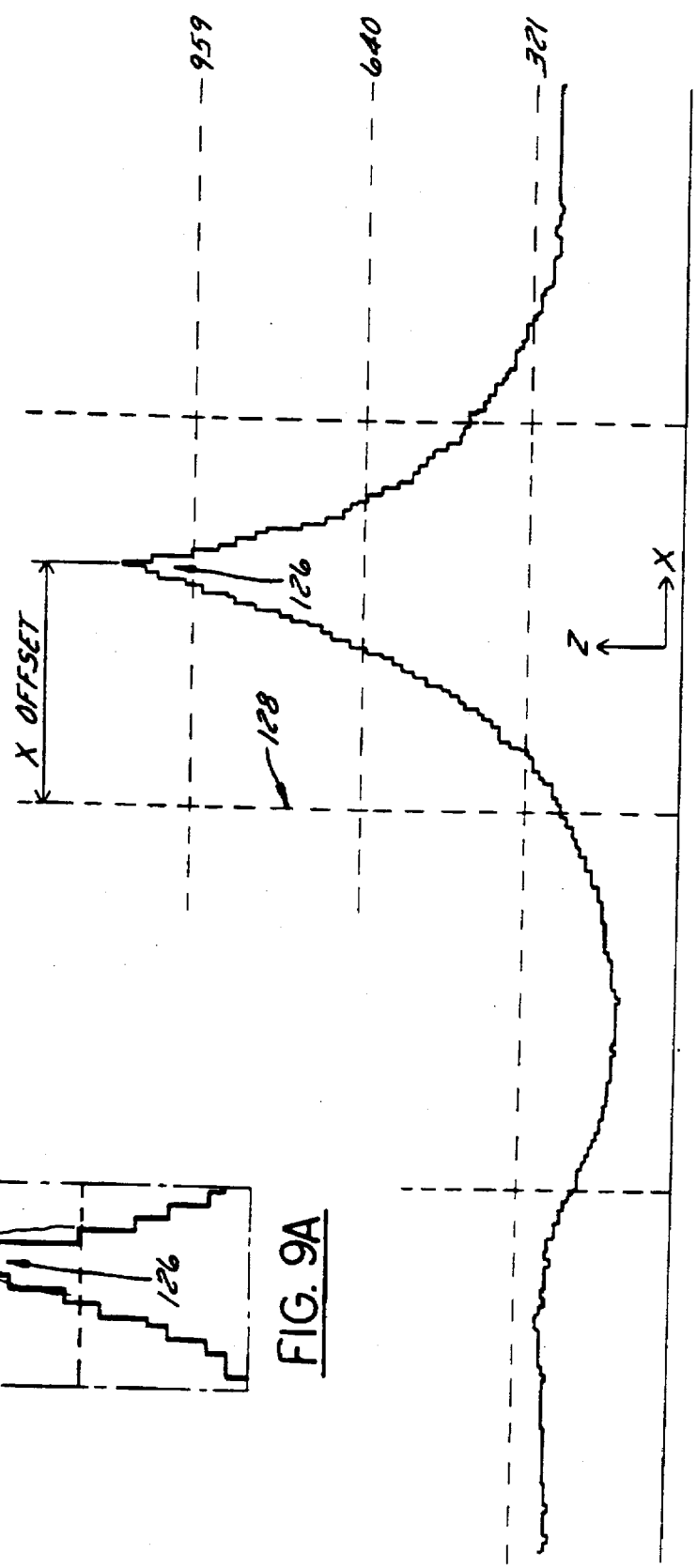
FIG. 9 is a sectional view of the three dimensional graph of FIG. 7 taken along section line 9—9.

Computer 32 is also programmed to operate as a maximum value location determining circuit 122 and a location comparison circuit 124. Referring to FIGS. 7, 8 and 9, FIG. 8 includes a maximum cross correlation value 126 (magnitude in the Z direction) which is located at an X, Y position in the comparison array. The X and Y positions of value 126 are determined by circuit 122 by scanning the values of the comparison array.

If the RGBI images are perfectly separated into CMYK images, and if the images are suitable for registration, each of the correlated images will contain a single correlation peak. In the present embodiment of the invention, however, there may be multiple peaks in each of the correlated images because the images may not be perfectly separated. Thus, maximum value location determining circuit 122 is also configured to select a single peak among multiple peaks in each correlated image.

By way of example, maximum value location determining circuit 122 computes the three highest peaks in each correlation image by determining the local maximum within an eight pixel neighborhood. In the black correlation image, maximum value location determining circuit 122 assumes the first local maximum is the peak. The coordinate of the first peak in the cyan correlation is compared to the coordinate of the black peak. If the distance between the two coordinates is within a range of values (e.g., 0 to $\sqrt{2}$) maximum value location determining circuit 122 assumes the first peak in the cyan correlation image is a ghost black peak which results because of the high correlation between cyan and black. The second peak in the cyan correlation image is then compared to the coordinate of the black peak and assumed to be the cyan peak if the distance between the black peak and the second peak in the cyan correlation image is outside of the predetermined range. Similarly, maximum value location determining circuit 122 selects a magenta peak based on a comparison of the location of the three highest peaks in the magenta correlation image to the location of the black peak. Finally, the three highest peaks in the yellow correlation image are compared to the locations of the black and magenta peaks. The location of the peak in the yellow correlation image which is not within the predetermined range of distance to the locations of the black and magenta peaks is assumed to be the yellow peak.

FIG. 8 is a two-dimensional view of the graph in FIG. 7 taken along line 8—8 which better illustrates the location of value 126 relative to the Y axis. FIGURE 9 is a two-dimensional view of the graph in FIG. 7 taken along line 9—9 which better illustrates the location of value 126 relative to the X axis. Since the comparison array represents the cross correlation of data from the image density arrays, which are 512×512 arrays due to the resolution of cameras 92, 104, 106, 108 and 110 (512×480 pixels) and the average filling of the 512×480 density arrays to produce 512×512 density arrays which can be manipulated by an FFT, array values in the X and Y directions are for positions of the image scan areas spaced 0.00195 inches (1 inch/512 pixels) apart. Thus, the geometric location of value 126 relative to the X and Y geometric centerlines 128 and 130 (also see FIG. 3) can be readily determined. More specifically, comparison circuit 124 determines the number of comparison array values located between the center of the array and value 126 along the X and Y axes, and multiplies these numbers by 0.00195 inches. For example, if the X offset is 11 values and the Y offset is 7 values, then the offset is 0.02145 inches along the X axis and 0.01365 inches along the Y axis.

Figure 10:
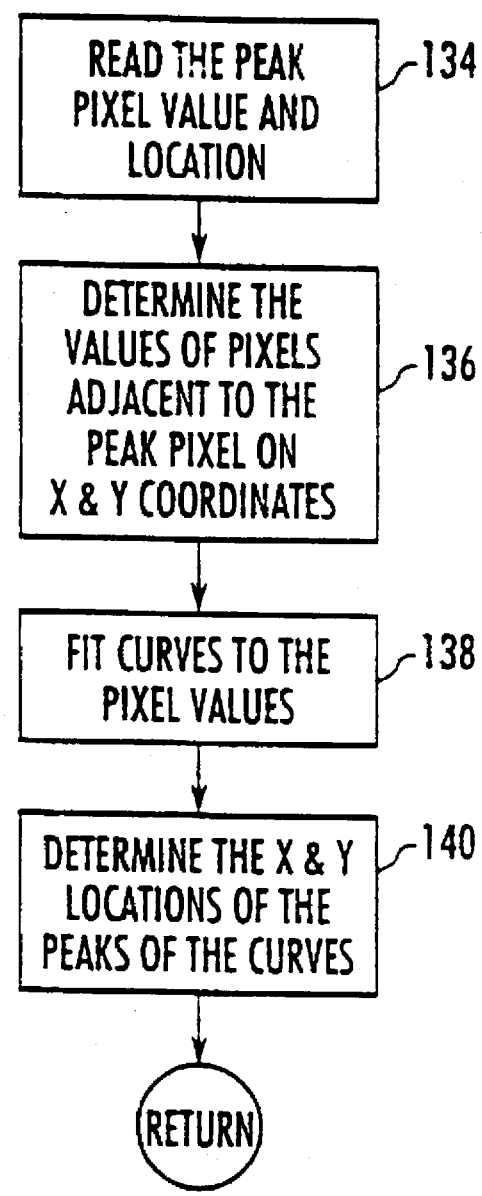
FIG. 10 is a flow chart for further determining sub-pixel offsets for registration purposes.

To further refine the X and Y offsets, computer 32 is programmed as a curve fitting circuit 132. Referring to FIG. 10, circuit 132 reads value 126, and its X and Y array locations (step 134), and determines the values located at ±n locations along the X and Y axes (step 136) adjacent value 126. After the adjacent values are determined, circuit 132 fits curves to the values along the X and Y axes (step 138, e.g., elliptical paraboloid curve fit) and determines the location (X and Y sub-pixel offsets, e.g., lengths 142 and 144) of the maximum value of the elliptical paraboloid in relation to the location of value 126 (step 140, see FIGS. 8 and 9 for a graphical representation). These locations of the maximum values allows the X and Y offsets to be corrected by adding or subtracting the X and Y sub-pixel offsets from the X and Y offsets calculated by circuit 124. By way of modification, functions other than an elliptical paraboloid may be used to fit the values. For example, curve fitting may be performed by one dimensional parabolic fits separately performed in X and Y.

The use of sub-pixel offsets 142 and 144 provides X and Y offsets at a finer resolution than circuit 124 can provide. However, depending upon the pixel resolution of cameras 92, 104, 106, 108 and 110, and/or the system requirements, the additional accuracy in determining the offsets provided may not be required, or may not justify additional processing time.

Subsequent to determining the X and Y offsets for all of the colors (CMYK) between reference areas 87 and 89, and image scan areas 88 and 90, the offsets are referenced to one of the colors of the areas 88 and 90, respectively, by computer 32, which is programmed to operate as a referencing circuit 146. By way of example, if the X and Y offsets are as listed in the following Table 1:

TABLE 1

| | AREA 88 | | | AREA 90 | |
|---|---|---|---|---|---|
| | X Offset | Y Offset | | X Offset | Y Offset |
| CYAN | .01 | .03 | CYAN | .05 | .03 |
| MAGENTA | .04 | .01 | MAGENTA | .03 | .01 |
| YELLOW | .03 | .02 | YELLOW | .04 | .02 |
| BLACK | .05 | .00 | BLACK | .01 | .00 | and the reference color is cyan, then the new offsets would be as listed in the following Table 2:

TABLE 2

| | AREA 88 | | | AREA 90 | |
|---|---|---|---|---|---|
| | $X_{88}$ Offset | $Y_{88}$ Offset | | $X_{90}$ Offset | $Y_{90}$ Offset |
| CYAN | — | — | CYAN | — | — |
| MAGENTA | .03 | −.02 | MAGENTA | −.02 | −.02 |
| YELLOW | .02 | −.01 | YELLOW | −.01 | −.01 |
| BLACK | .04 | −.03 | BLACK | −.04 | −.03 |

Referring back to FIG. 1, computer 32 uses the referenced X and Y offsets and signals representative of the speed and registration of print units 14, 16, 18 and 20 to apply control signals to controller 30, which applies the proper signals to units 14, 16, 18 and 20 to place the colors (CMYK) of the printed image of web 12 into registration.

To perform only color-to-color longitudinal (X) and lateral (Y) registration, only one reference area (87 or 89) and one image scan area (88 or 90, including all printed colors) are required. However, to perform skew registration, two reference areas and two image scan areas are required. More specifically, if the lateral and longitudinal offsets for image scan areas 88 and 90 are different, a skew color-to-color registration correction is required. For example, the skew misregistration angle (θ) for magenta is calculated in the following Equation 11:

$$\theta = \sin^{-1}\left( \frac{y_{90} - y_{88}}{x_1} \right) \quad (11)$$

where $x_1$ is the X distance between areas 88 and 90, $Y_{88}$ is the misregistration in the y direction of the magenta color as compared to the reference color (−0.02 in the previous example) (see FIG. 3 for a graphical representation of $x_1$).

Based upon the rotational offsets calculated by computer 32, signals are applied to controller 30 via bus 86 such that rotational color-to-color misregistration between units 14, 16, 18 and 20 is corrected.

In general, cross correlation followed by peak interpolation (subpixel accuracy) results in $1/100^{th}$ of a pixel accuracy. Despite this accuracy, however, there are situations (particularly in registering halftone images) wherein cross correlation will report registration which is in error by one halftone dot spacing. In these cases, system 10 cannot achieve registration of the image because the incorrect peak location is used to register the reference image to the on-press image for a particular color. Specifically, the combination of the following conditions may cause cross correlation to fail:

1. If the detail in the image along some direction is predominantly halftone dots;
2. If the actual registration between the two images falls roughly halfway between pixels in X and Y; and/or
3. If the dot spacing is such that one of the neighboring peaks falls on an integer pixel.

Figure 11A:
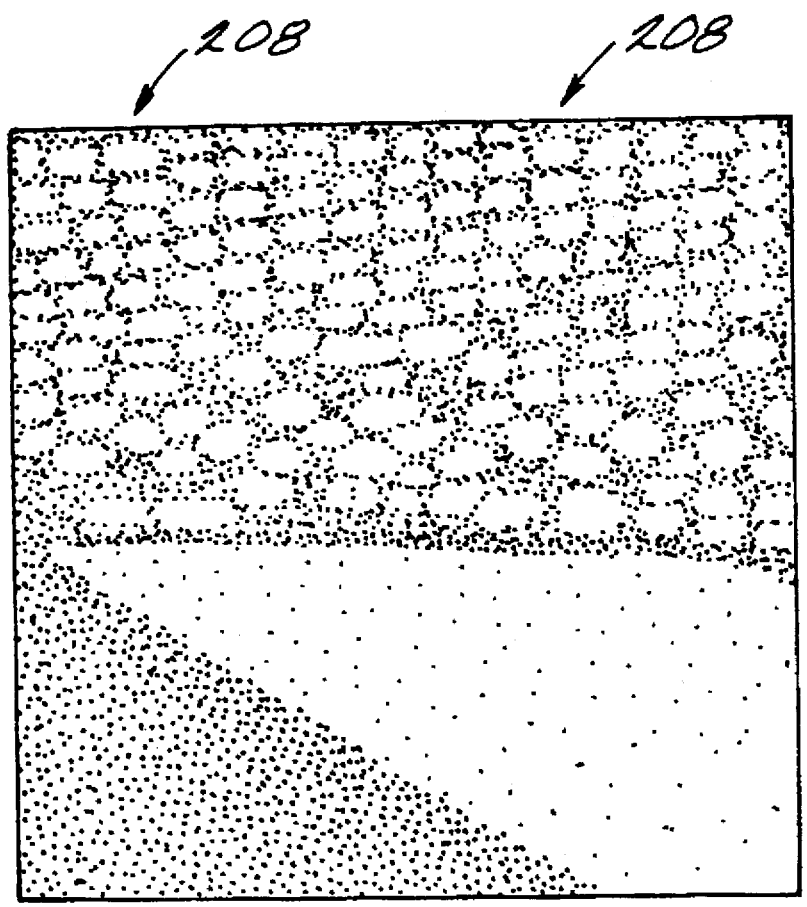
FIG. 11A is a reference image of a fabric ribbon.
Figure 11B:
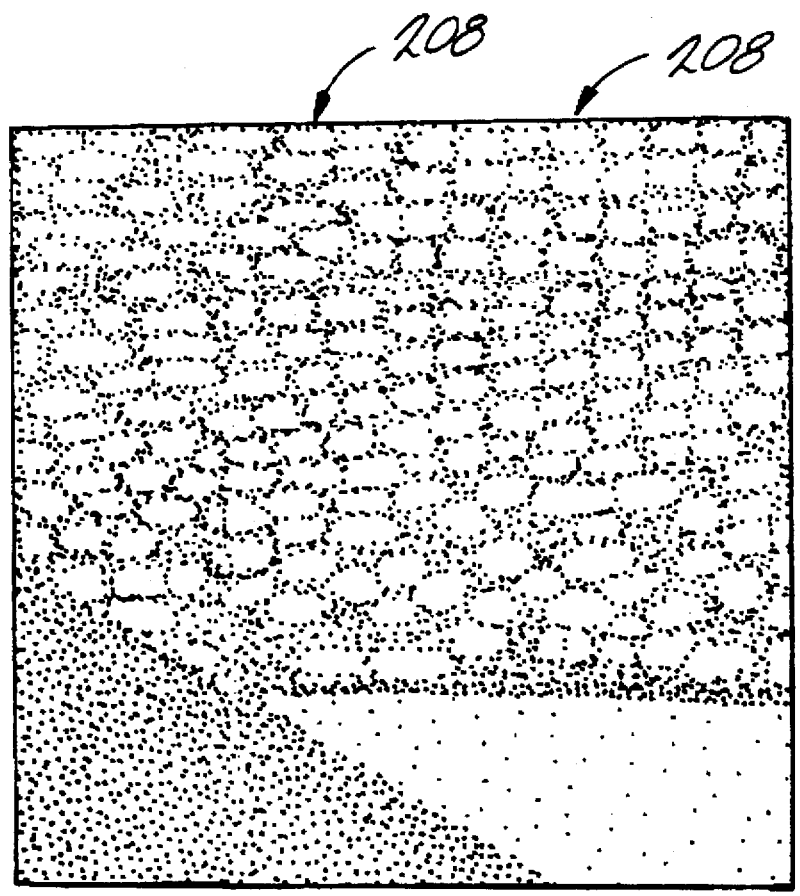
FIG. 11B is an on-press image of a fabric ribbon.
Figure 12:
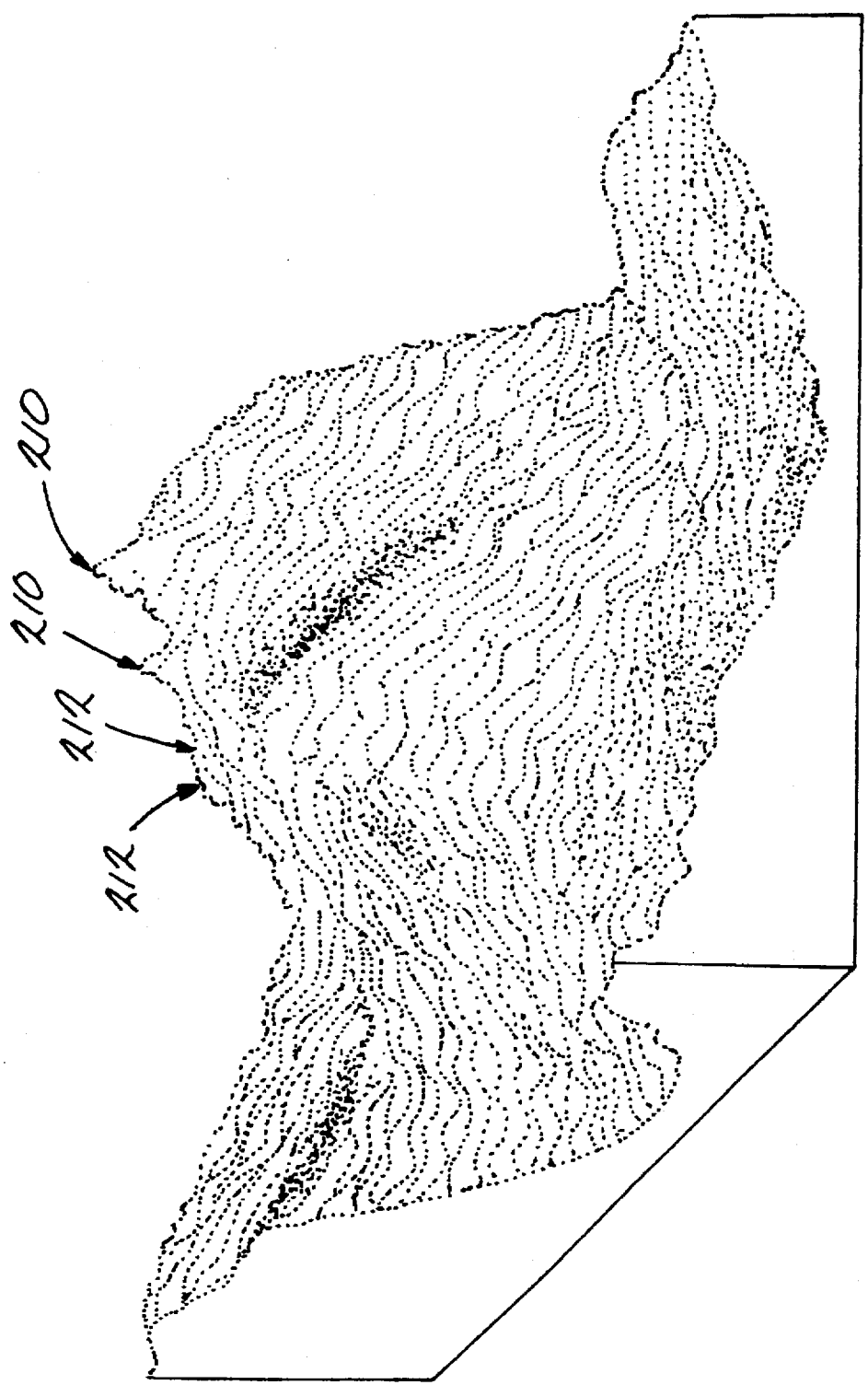
FIG. 12 is a 3-dimensional representation of the cross correlation between the reference and on-press images of a fabric ribbon.

FIGS. 11A and 11B are reference and on-press images, respectively, of fabric from a watch band which has a repeating pattern 208. The 3-dimensional representation of the cross correlation image of FIG. 11A with FIG. 11b is depicted in FIG. 12. The repeating pattern of the fabric results in multiple large peaks 210 and the halftone dot pattern results in multiple small peaks 212 in the cross correlated image (FIG. 12). If the on-press image is misregistered by one fabric weave, or one dot spacing, the reference image is still able to correlate with the on-press image because of the similar repeating pattern in both images, resulting in correlation peaks 210 depicted in FIG. 12. Peaks 210 are of similar amplitude and distortions caused by misregister can cause the wrong peak to have the largest amplitude.

A preferred alternative to using cross correlation to measure image-to-image registration is to measure misregister with phase correlation. Phase correlation works on the principle of suppressing scales and orientations which are overpowering and amplifying scales and orientations which are weak, thereby eliminating the problem of selecting the incorrect peak by normalizing the data. (See generally, Kuglin, C. D. and Hines, D. C., "The Phase Correlation Image Alignment Method," *Proceedings of the 1975 International Conference on Cybernetics and Society*, Sep. 23–25, 1975, The Hyatt Regency Hotel, San Francisco, Calif., IEEE Systems, Man and Cybernetics Society, pp. 163–165.)

Phase correlation allows each scale and orientation the same amount of energy with which to "vote" for the best misregistration by normalizing the weight applied to all frequencies. By normalizing the frequencies, the effect of the few large frequency spikes caused by halftone dots is deemphasized. After the images are scale normalized, the phase correlation image has the value 0 everywhere except for one pixel, (the "dot"), which has the value of 1. The position of this dot is directly related to the direction and magnitude of the misregistration between the on-press and reference images. If the on-press and reference images are in perfect register, the dot is exactly in the center of the image.

Phase correlation is an image restoration process which attempts to undo the convolution which degraded the phase correlated or "dot" image into the on-press image. The reference image contains the necessary information to de-convolve or "restore" the image. It is extremely difficult to undo a convolution of an image in the spatial domain. In the frequency domain, however, deconvolution is as easy as division.

In order to deconvolve an image, the convolution process is simply undone. An image is convolved in the frequency domain in the same manner the above-referenced cross correlation was performed. With cross correlation, the 2D Fast Fourier Transform ("FFT") is applied to the reference and on-press images, the point-by-point product is formed and the inverse FFT is applied to the resultant product. Therefore, dividing in the frequency domain will restore the image.

More precisely, assume there are two images, f and g, with one image being a translated version of the other (the reference and on-press images).

$$g(x,y)=f(x+X_o, y+Y_o) \quad (12)$$

The Fourier transforms of f and g, (F and G, respectively), are related by the following equation:

$$G(u,v)=F(u,v)e^{i(uX_o+vY_o)} \quad (13)$$

The FFT of the on-press image G(u,v) is the product of the FFT of the phase correlated or "dot" image with the FFT of the reference image F(u,v), including some noise. If the FFT of the on-press image G(u,v) is divided by the FFT of the reference image F(u,v), the FFT of the "dot" image, including noise, is obtained. The inverse FFT of $e^{i(uX_o+vY_o)}$ is an image which contains all zeros except for a spike (peak) at $(X_o, Y_o)$. The inverse FFT of the noisy "dot" image $e^{i(uX_o+vY_o)}$ is the phase correlation which represents the positional information of the peak, hence the misregistration between the on-press and reference images.

One approach to solving for $H(u,v)=e^{i(uX_o+vY_o)}$ is to compute the above division by multiplying the numerator and denominator by the complex conjugate of the denominator F(u,v) because G(u,v) and F(u,v) are complex numbers.

$$H(u,v) = \frac{G(u,v)F^*(u,v)}{F(u,v)F^*(u,v)} \quad (14)$$

An equivalent formulation of the quotient in Equation 14, provided image g is merely a translation of image f which enables the denominator to be expressed as G(u,v) F* (u,v), is as follows:

$$\hat{H}(u,v) = \frac{G(u,v)F^*(u,v)}{|G(u,v)F^*(u,v)|} \quad (15)$$

With the addition of noise, the calculation for H(u,v) can be arbitrarily large as F(u,v) approaches zero. This is a source of sensitivity to noise since H(u,v) in the absence of noise will have a magnitude of 1. $\hat{H}(u,v)$, however, is obtained by dividing a complex number by its magnitude, so $\hat{H}(u,v)$ will always have a magnitude of 1. The relative error in $\hat{H}(u,v)$ is smaller than the relative error in H(u,v).

The general operation of the registration system using phase correlation will now be described in conjunction with FIGS. 6A and 6B.

Computer 32 compares the CMYK reference image density data for the reference areas and the corresponding CMYK on-press image density data for image scan areas 68. To perform the comparisons, computer 32 is configured to operate as correlation circuit 118 which performs two-dimensional phase correlations, transform circuit 116 and inverse transform circuit 120 which perform fast Fourier and inverse Fourier transforms on the reference and on-press image density data for the cyan, magenta, yellow and black images.

In the presently preferred embodiment, transform circuit 116 computes the fast Fourier transform (FFT) of the reference and on-press image density data for each color (CMYK) of reference areas 87 and 89 and on-press image scan areas 88 and 90.

Subsequently, correlation circuit 118 calculates a quotient array of phase values based on the values of $\hat{H}(u,v)$ for each cyan, magenta, yellow and black image given values of G(u,v), representing the on-press or reference fast Fourier transformed image density data for each color, and F*(u,v), representing the complex conjugate of the on-press or reference fast Fourier transformed image density data for each color.

Figure 13:
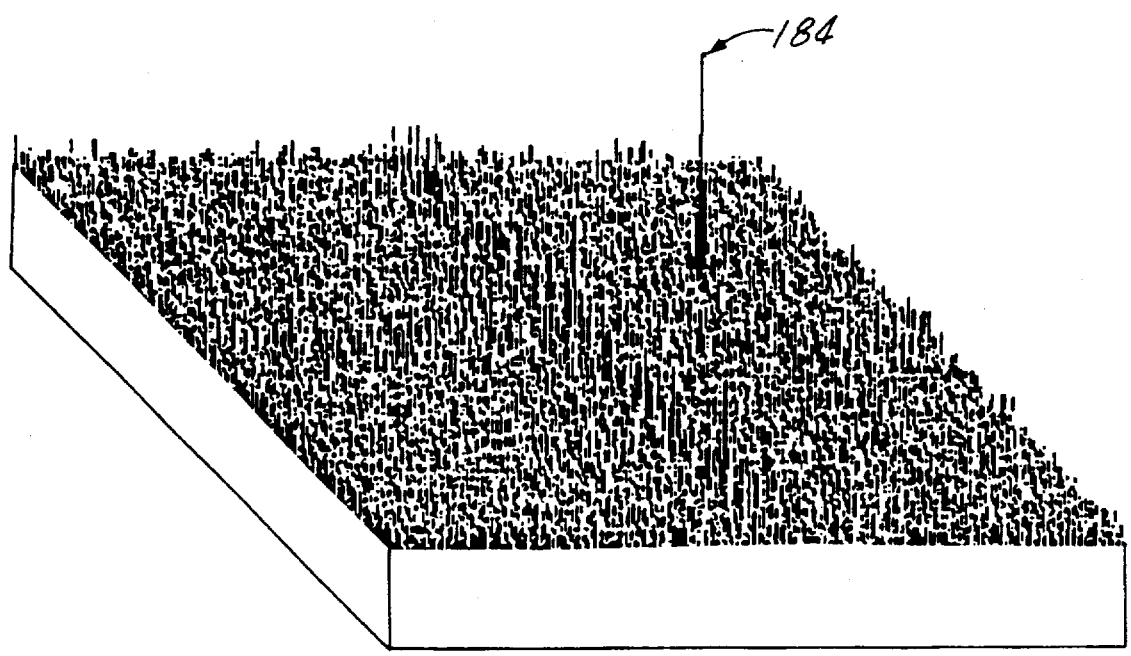
FIG. 13 is a 3-dimensional representation of the phase correlation between the reference and on-press images of a fabric ribbon.

In accordance with Equation 15, all points in frequency space are scaled to a magnitude of 1, regardless of the initial size of the data point. FIG. 13 illustrates how phase correlation emphasizes a main peak 184 which is distinct from any secondary peaks. The values of $\hat{H}(u,v)$ in the quotient arrays for each color (CMYK) of reference areas 87 and 89 and on-press image scan areas 88 and 90 are stored in memory 33.

Inverse transform circuit 120 computes the two-dimensional inverse Fourier transformations of the phase correlation values $\hat{H}(u,v)$ in the quotient arrays for each color (CMYK) and stores this data, representing the phase correlated image, in memory 33.

Similar to cross correlation registration, computer 32 is also programmed to operate as a maximum value position determining circuit 122, a location comparison circuit 124 and subpixel offset circuit 132. After the coordinates of the peaks for each color (CMYK) are determined based on the inverse fast Fourier transformations of $\hat{H}(u,v)$, location comparison circuit 124 provides the coordinates of the peaks and their 8 immediate neighboring points to subpixel offset circuit 132.

Correlation circuit 118 efficiently identifies peaks by normalizing frequencies which result in a "spike" which is clearly set apart from all other data points. The lack of subpixel information around the peak makes it difficult to further refine the location of the peak by fitting curves to the peak and its surrounding data points. Cross correlation, however, produces subpixel information around the peak, thereby allowing subpixel offset circuit 132 to fit curves to the peak and correct the location of the peak with subpixel X and Y offset values.

In the presently preferred embodiment, subpixel offset circuit 132 computes cross correlation values without the use of fast Fourier transformations using the location of the peak and its 8 immediate neighboring points. By way of modification, subpixel offset circuit 132 can use Fourier and inverse Fourier transforms to calculate cross correlation values which provide greater precision, but at a cost of roughly double the computation time.

This method of computing the cross correlation without using Fourier transforms is further described in *Digital*

*Signal Processing*, William K. Pratt, 1991, pp. 662–666. By way of example, let F (j,k) and G (j,k), for $1 \leq j \leq J$ and $1 \leq k \leq K$, represent two discrete images to be registered, wherein F(j,k) is considered to be the reference image. The normalized cross correlation between the image pair is defined as:

$$R(m,n) = \frac{\sum_j \sum_k F(j,k)G(j-m+(M+1)/2, k-n+(N+1)/2)}{\left[\sum_j \sum_k [F(j,k)]^2\right]^{1/2} \left[\sum_j \sum_k [G(j-m+(M+1)/2, k-n+(N+1)/2)]^2\right]^{1/2}} \quad (16)$$

for m=1,2,..., M and n=1,2,..., N, wherein M and N are odd integers. The bounds of the summation of Equation 16 are as follows:

$$\text{Max}[1, m-(M-1)/2] \leq j \leq \text{MIN}[J, J+m-(M+1)/2]$$

$$\text{Max}[1, n-(N-1)/2] \leq k \leq \text{MIN}[K, K+n-(N+1)/2]$$

In accordance with Equation 16, subpixel offset circuit 132 obtains reference and on-press image density data for the phase correlation peak and its 8 neighbors, computes cross correlation values R(m,n) for these 9 values, fits curves to these values (e.g. by elliptical paraboloid curve fit), and determines the locations (X and Y subpixel offsets) of the maximum value of the elliptical paraboloid in relation to the location of the peak determined by phase correlation circuit 118. The location of the maximum value allows the X and Y offsets to be corrected by adding or subtracting the X and Y subpixel offsets from the X and Y offsets calculated by location comparison circuit 122.

By way of modification, subpixel offset circuit 132 can obtain refined X and Y offset locations for phase correlation with the use of a Gaussian blur function:

$$Z = (e^{-\sqrt{x^2+y^2}})^{1/2} \quad (17)$$

Either the reference image or the on-press image may be convolved with the Gaussian blur function of Equation 17 to result in an image which appears slightly out of focus. After performing the phase correlation with one image blurred and the other image not blurred, the correlation peak will be slightly broadened and the accuracy of subpixel offset circuit 132 will be significantly improved. The Gaussian blur may be performed as a two-dimensional Finite Impulse Response (FIR) filter or, since the Gaussian function is separable, it may be performed more efficiently by first convolving the image with a one-dimensional Gaussian blur in the X or Y direction, and then convolving the result with a one-dimensional Gaussian blur in the other (Y or X) direction. By way of modification, it may also be implemented in the frequency domain by multiplication of the Fourier transform of the image with the Fourier transform of the Gaussian function. Additionally, acceptable results can be obtained by optically defocusing the lens of camera 93 or using any filter which dampens higher frequencies while preserving the phase data.

Subsequent to determining X and Y offsets for all of the colors (CMYK) between reference areas 87 and 89, and on-press image areas 88 and 90, the offsets are referenced to one of the colors of the areas 88 and 90, respectively, by computer 32, which is programmed to operate as a referencing circuit 190.

Referring back to FIG. 1, computer 32 uses the referenced X and Y offsets and signals representative of the speed and registration of print units 14, 16, 18 and 20 to apply control signals to controller 30, which applies the proper signals to units 14, 16, 18 and 20 to place the colors (CMYK) of the printed image of web 12 into registration.

Figure 14:
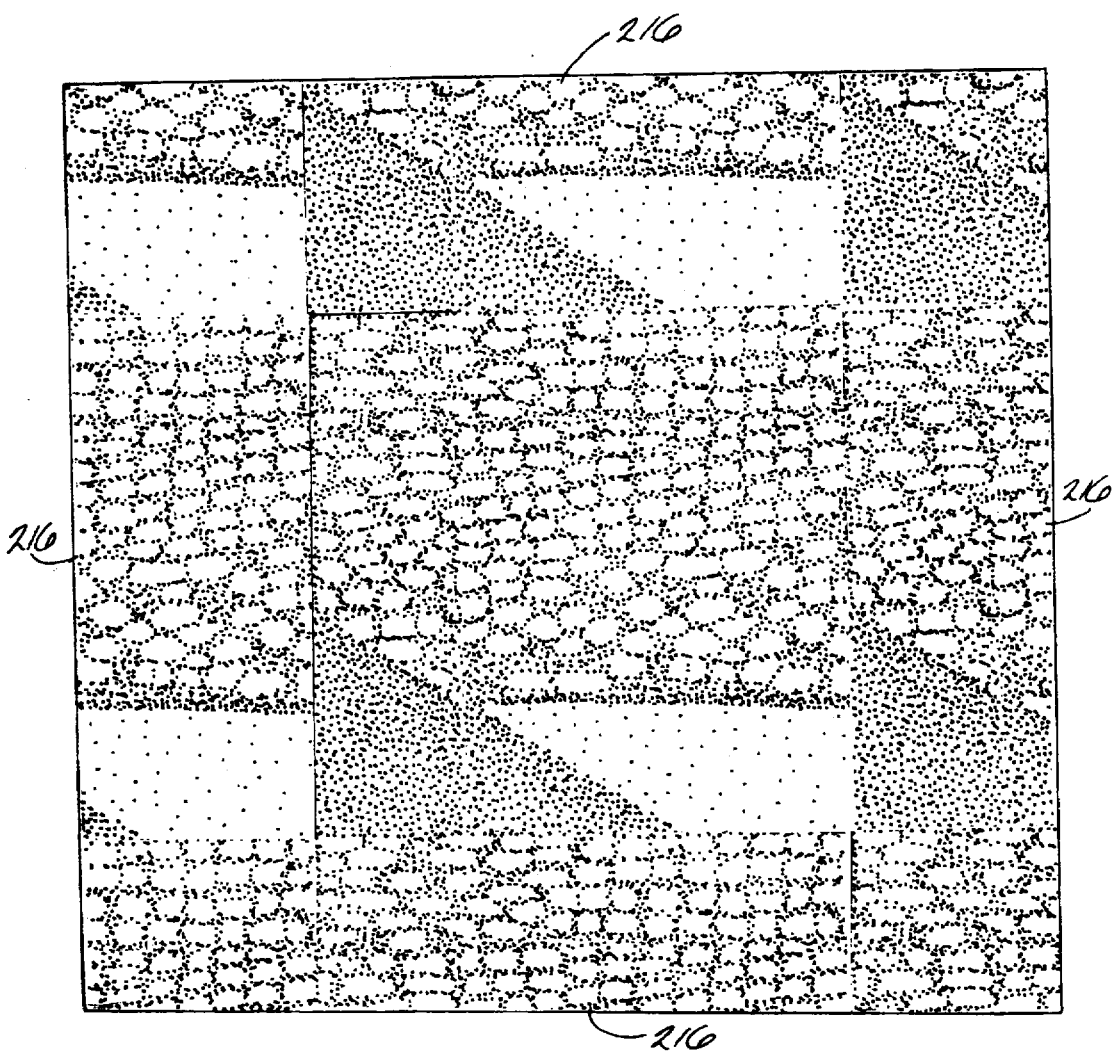
FIG. 14 is a representation of the image "circular correlation" effect caused by computing a correlation assuming there are multiple copies of the image at the edges.

Referring to FIG. 14, if the cross or phase correlation of two 512—512 images (FIGS. 11A AND 11B) is computed with the aid of 512×512 fast Fourier transforms, the correlation is computed as if there are multiple copies 216 of the image at its borders ("circular correlation"). The image of the watch band depicted in FIG. 11A is the same image in FIG. 14, except FIG. 14 contains multiple copies 216 of the image of the watch band at its borders in order to compute fast Fourier values.

For small amounts of misregistration, the computation of FFTs assuming there are multiple copies of the image on its borders will result in an insignificant amount of corruption. The border images will generally contribute very little to the correlation since the border images will not typically correlate to the image. For significant amounts of misregistration, however, the contribution of the border images to the correlation may be large enough to skew the location of the correlation peak.

Figure 15:
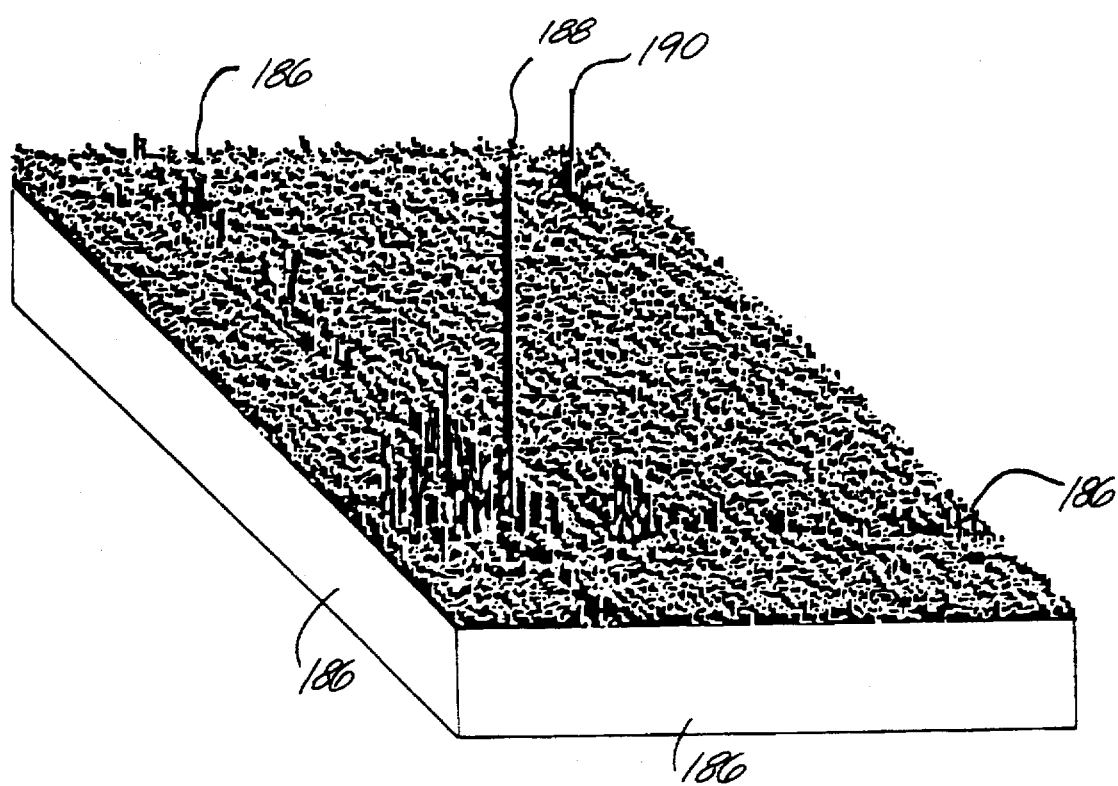
FIG. 15 is a 3-dimensional representation of the resulting peak image including a cross-shaped artifact resulting from phase correlation.

FIG. 15 is a 3-D representation of the phase correlation map which contains a cross-shaped artifact 186 resulting from the edges of the reference image correlating with the edges of the on-press image. The center of the cross-shaped artifact results in peak 188 which has more amplitude than "true" correlation peak 190. In this case, maximum value location determining circuit 122 would select the incorrect peak for registration.

A conventional method to minimize the effects of the edges correlating to themselves is to apply vignetting, also known as "windowing" or "apodization," wherein the edges of the template or "reference" image are faded. By way of example, the average pixel intensity is first subtracted from the image then the entire image is multiplied, pixel by pixel, by a function which is one at the center and smoothly transitions to zero, or near zero, at the edges. This function is preferably the "pyramid function" (or two-dimensional Parzen window) which makes a linear transition in all directions from the center to zero at all of the edges. By way of modification, other functions could be substituted for the pyramid function such as the Hamming window, the Hanning window, the Welch window, the Bartlet window or the Kaiser window.

This windowing reduces the signal at the edges of the image, thereby eliminating the effects of the edges on the correlation. With this method, however, large misregistration can no longer be computed because the needed image elements are near the edges, but this part of the image has been substantially removed.

Another method of minimizing edge artifacts is known as plane subtraction. The average value of all points in each row of pixels is computed for each column, a line is fitted to the resultant 1-dimensional curve, and the value of each point in the line is subtracted from all points in each corresponding row. This process is then repeated, using columns rather than rows. This process "flattens" the image by removing the overall slope such that the edges tend to be maximally aligned in their opposite edges, thus minimizing edge effects. Equivalently, the plane subtraction technique fits a plane to the image and subtracts this plane. Second order equations may be fit to the image to improve the edge suppression.

Figure 16:
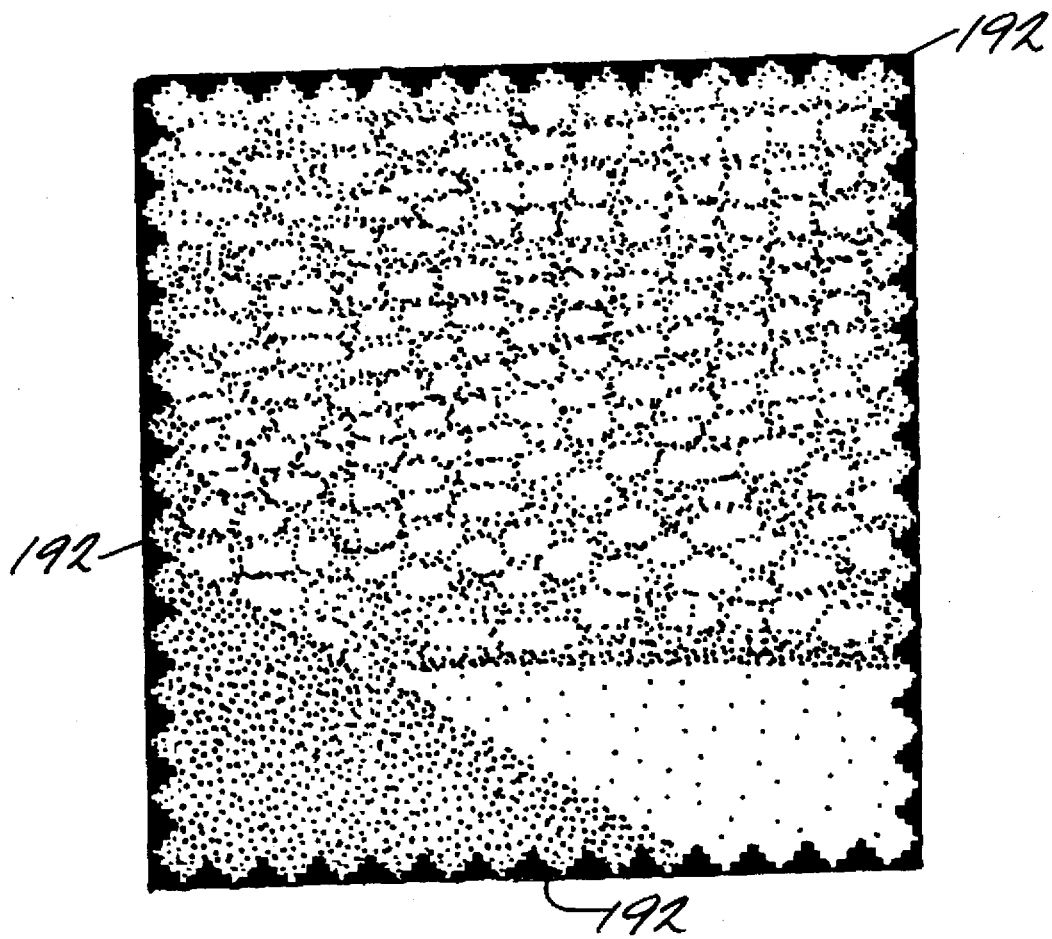
FIG. 16 illustrates a "cookie cutter" pattern applied to the edges of the reference image of a fabric ribbon.
Figure 17:
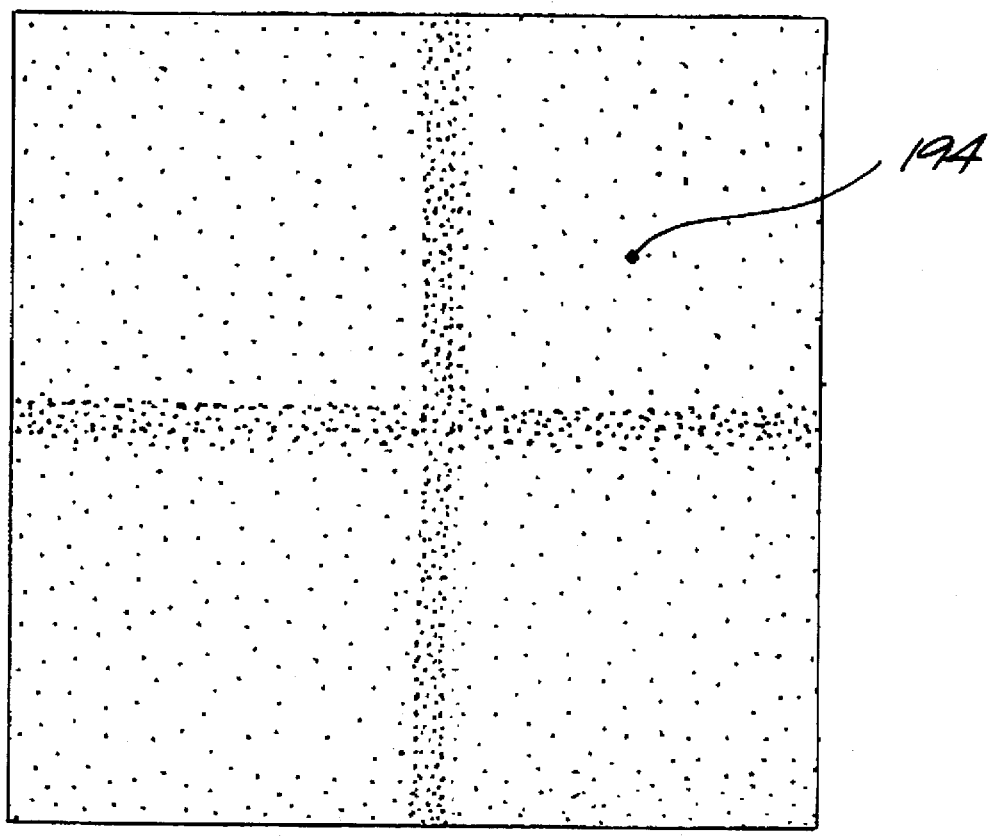
FIG. 17 illustrates the resulting peak image from correlating a reference image containing a "cookie cutter" pattern applied to the reference image of a fabric ribbon.

Another method to minimize the contribution of the edges to the correlation is to apply a pattern to the edges of one of the images. FIG. 16 depicts a "cookie-cutter" pattern 192 applied to the edges of a reference image. FIG. 17 illustrates the correlated image with an easily-identifiable correlation peak 194. The application of the pattern to the edges of the image causes the energy of the cross-shaped edge artifact to be dispersed rather than concentrated along a single line. The regular pattern of the scalloping itself, however, can also cause artifacts.

Figure 18:
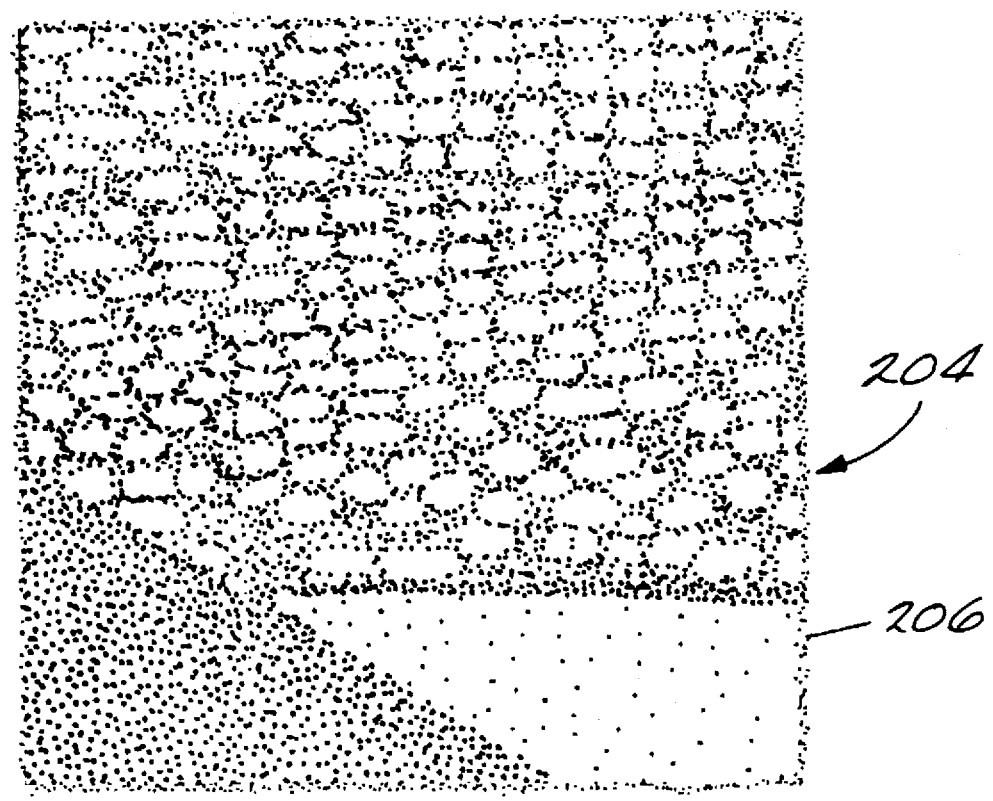
FIG. 18 illustrates a random noise pattern applied to the edges of the reference image of a fabric ribbon.

In the preferred embodiment, pseudo-random data is substituted around the border of the reference image. As depicted in FIG. 18, approximately the outermost two pixels of the border 204 are replaced with pseudo-random data pixels 206 having the same average brightness (or amplitude) as the average brightness (or amplitude) of all of the pixels of the image.

Figure 19:
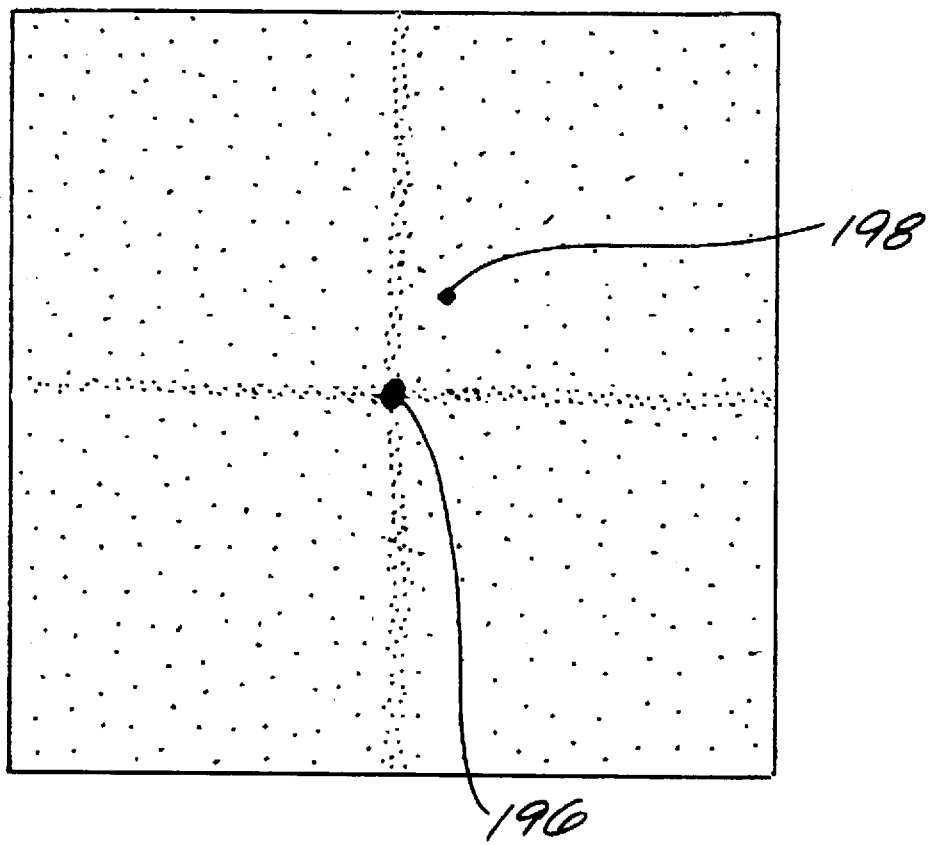
FIG. 19 illustrates the peak image resulting from correlating the on-press image of a fabric ribbon with the reference image of a fabric ribbon without any pattern applied to the edges of the image.
Figure 20:
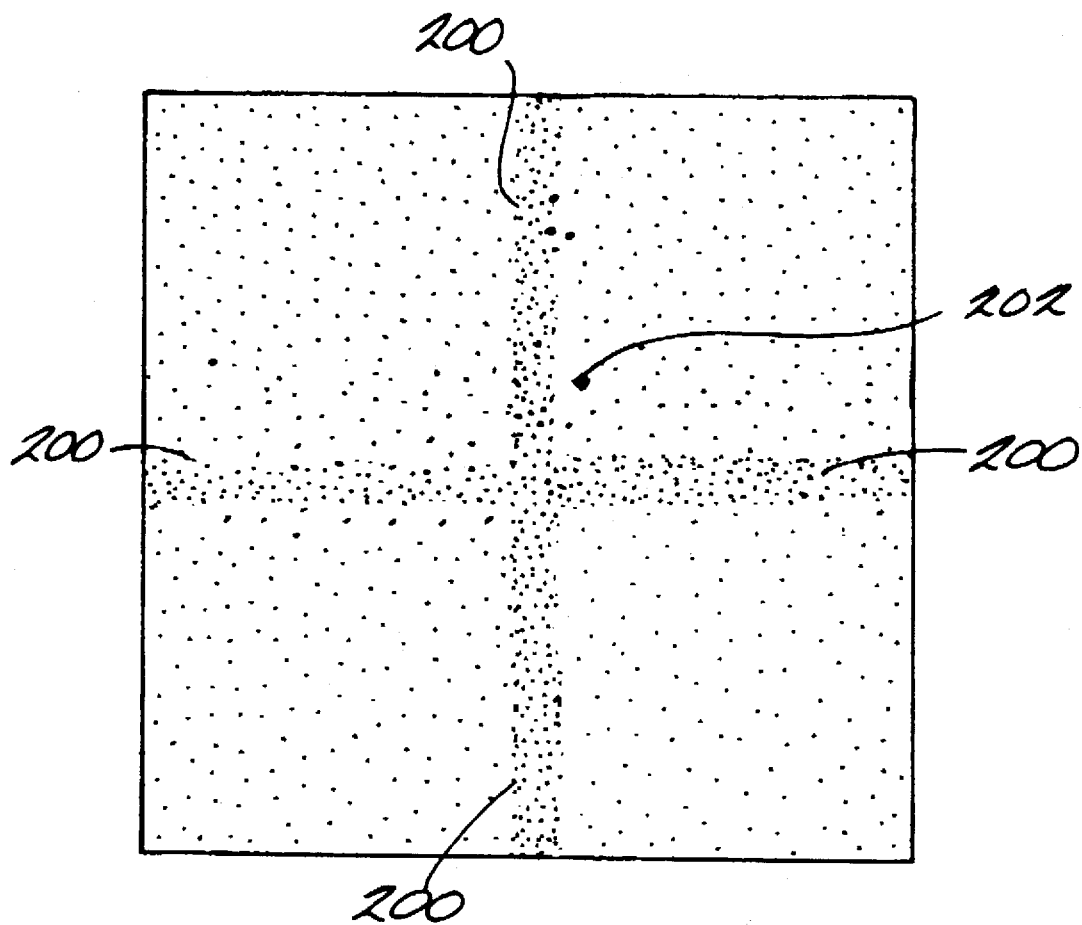
FIG. 20 illustrates the peak image resulting from correlating the on-press image of a fabric ribbon with the reference image of a fabric ribbon with a random noise pattern applied to the edges of the image.

A comparison of the effects of the noise border is illustrated in FIGS. 16 and 17. In FIG. 19, the borders of the reference image were not altered. The cross-shaped edge artifact in the correlation image passes through the center of the image and peak 196 at the origin is stronger than true correlation peak 198. In FIG. 20, the noise around the border of the image results in distribution of cross-shaped artifact 200 over an area twice the width of the noise border. No individual pixel in the cross-shaped artifact receives a large contribution from the wrapped-around edge effect because the pixels comprising artifact 200 are spread out rather than concentrated. In this case, maximum value location determining circuit 122 would select the correct correlation peak 202 for registration.

The above-described registration system is configured to operate and provide accurate registration between the printed colors of a printed image when the colors printed by printing units 14, 16, 18 and 20 are in substantial registration. However, when the printed colors are not in substantial registration (e.g., during transition periods such as start-up), the misregistration may be so severe that system 10 may be unable to bring the colors into registration. This inability to perform registration typically occurs when the color images in the on-press reference areas 87 and 89 do not partially overlap the corresponding color images in image scan areas 88 and 90.

To respond to substantial misregistrations, system 10 is configured to perform a primary registration process to substantially register the colors of the printed image. After bringing the printed colors into substantial registration, system 10 uses the registration process described above ("secondary registration") to bring the printed colors into registration with greater precision.

In general, primary registration operates in substantially the same way as secondary registration. However, the reference area for primary registration is larger than the reference area used for secondary registration. Referring to grid 66 of FIG. 2B, reference areas 87a and 89a are used for primary registration. In the present embodiment, areas 87a and 89a are nine (9) times as large as areas 87 and 89. Accordingly, there will be nine (9) times the amount of data stored as a result of scanning the printing plates for areas 87a and 89a.

Image density data for each color in reference areas 87a and 89a is generated in the same manner as for areas 87 and 89, discussed above in reference to FIG. 4. However, since primary registration compares reference areas 87a and 89a to scan image areas 88 and 90, respectively, only ⅑ of the image density data from areas 87a and 89a is needed. More specifically, to compare the image density data from areas 87a and 89a with the image density data from areas 88 and 90, respectively, there should be an equal amount of data representative of the areas.

A number of methods may be used to determine which of the image density data from areas 87a and 89a is used to determine registration offsets in accordance with FIG. 6. For example, the image density data from every third pixel along the X and Y axes may be used as the image density data for areas 87a and 89a. By way of another example, depending upon the printed image, the image density data selected for areas 87a and 89a may be the average of 9 pixels for a 3×3 pixel area or may be a selection of image density data based upon a selection of data toward a particular portion of an image with varying frequencies.

After selecting the image density data for areas 87a and 89a, this data is compared to the on-press image density data for CMYK in the same manner as described in detail in reference to FIG. 6 for the pre-press image density data. During secondary registration, comparison circuit 124 compares the location of the maximum value of the cross correlation process to the location of the center of the pertinent reference area 87 or 89, and during primary registration, circuit 124 compares the location of the maximum value of the cross correlation process to the center of the pertinent reference area 87a or 89a.

Due to the accuracy (i.e., within approximately 3 pixels) of the primary registration process, it may not be useful to utilize the sub-pixel offset correction produced by circuit 132 during primary registration. Rather, primary registration will bring the colors into registration which is close enough that the secondary registration will bring the colors into registration utilizing sub-pixel offset correction.

Depending upon the quality required for a printed image, and the maximum misregistration which can be expected during transient operation of a press, it may be possible to select a size for reference areas 87a and 89a which is large enough to handle the worst case of misregistration, but small enough that secondary registration is not necessary to provide a printed image with satisfactory quality.

The primary registration process can also be used to control camera positioning unit 34 to position assembly 36 to scan portions of a printed image which are suitable for providing registration. Reference areas such as 87a and/or 89a are referenced using primary registration for the purpose of controlling unit 34 to position assembly 36 to scan a selected one of areas 87 or 89 during secondary registration.

As discussed above, only ⅑ of the image density data from reference areas 87a and 89a is used for the primary registration process. To produce the signals necessary to control unit 34 to position assembly 36 in the X direction and properly time strobe assembly 37 (Y direction), computer 32 compares the on-press image density data for one of the colors C, M, Y or K in the area suitable for registration (e.g. 87 or 89) with the image density data for the pertinent reference area (e.g. 87a or 89a). More specifically, comparison circuit 124 compares the location of the maximum value produced by the cross correlation process carried out by circuit 118 on the image density data to the location of the center of the pertinent reference area 87a or 89a.

Based upon the X and Y offsets produced by circuit 124, computer 32 controls unit 34 to properly position assembly 36 in the X direction and properly time strobe assembly 37 (Y direction). Alternatively, the Y position of camera could be controlled, where assembly 37 does not use a strobe.

The microfiche appendix includes the source code listing for the present embodiment of programming (computer program) which configures computer 32 to operate as circuits 112, 114, 116, 118, 120, 122, 124, 132, 134, 136, 138, 140, and 146.

The presently preferred embodiment of a new color-to-color registration system based upon an analysis of the color densities of a portion of a printed image, rather than registration marks or the dot locations of a printed image, has been described above in detail. This description is of one embodiment which is readily modifiable. For example, certain printed images have characteristics which result in printing plates for all colors of the image having substantially the same image shape (i.e., the plates all look the same). In this situation, scanner 38 and the reference area derived therefrom is not necessary. More specifically, digital image data for each color of the printed image is produced as described above in reference to assembly 36, where, instead of initially comparing the on-press data for each color to the associated pre-press data (FIG. 6), the on-press data for the colors is compared to a reference color.

Referring to FIG. 6, and a specific example where the printed image includes CMYK, circuit 116 would only transform on-press image data for CMYK. Circuit 118 would multiply three of the four colors by the fourth color (e.g., cyan) and circuit 120 would take the inverse transforms of the products. Circuits 122, 124 and 132 would operate as described above to determine the X and Y offsets for the three colors. Circuit 146 would not be necessary since three of the colors would already be referenced to the fourth (reference color) of the printed data. Based upon the X and Y offsets between the reference color and the other colors of the image, computer 32 and controller 30 operate to correct misregistration between print units.

By way of further modification, a particular application may be optimized by performing a function on the pre-press and on-press image density values other than correlation. More specifically, a particular application may be better optimized by using the sum of the squares of the differences of corresponding image density values, or by using the normalized cross correlation, the correlation coefficient or matched filtering.

These and other modifications may be made without departing from the spirit or scope of the invention.

What is claimed is:

1. A system for generating a signal representative of color registration offset between at least first and second colors of an image printed on a web, wherein a first printing unit prints the first color of the image and a second printing unit prints the second color of the image, the system comprising:

a memory disposed to store a first reference array of digital data representative of the first color of at least a portion of the image and a second reference array of digital data representative of the second color of the portion of the image;

an imaging device in optical communication with the web to produce a first analog signal representative of the first color of the portion of the image and a second analog signal representative of the second color of the portion of the image;

a converter circuit, operatively associated with the imaging device and the memory, which converts the first analog signal to a first color array of digital on-press data, and converts the second analog signal to a second color array of digital on-press data; and a processing circuit in communication with the converter circuit and the memory, wherein the processing circuit phase correlates the first reference array with the first on-press array to produce first data and phase correlates the second reference array with the second on-press array to produce second data, the processing circuit comparing the first data and the second data to determine a registration offset between the first and second colors and produces a signal representative of the registration offset between the colors.

2. The system of claim 1, wherein the processing circuit further comprises a density conversion circuit which converts the first color array of digital on-press data into a first density array of digital data representative of the color density of the first color and converts the second color array of digital on-press data into a second density array of digital data representative of the color density of the second color.

3. The system of claim 1, wherein the processing circuit further comprises:

a correlation circuit which phase correlates the first reference array with the first on-press array to produce the first data as a first quotient array, and phase correlates the second reference array with the second on-press array to produce the second data as a second quotient array;

a maximum value determining circuit which determines the maximum values in the first and second quotient arrays; and a comparison circuit which compares the positions of the maximum values relative to the first and second quotient arrays to determine the registration offset between the colors.

4. The system of claim 1, wherein the processing circuit further comprises:

a transform circuit disposed to transform the data in the reference arrays and the on-press arrays to data referenced to a frequency domain;

a correlation circuit which phase correlates the transformed data from the first reference array with the first on-press array to produce the first data as a first quotient array, and phase correlates the transformed data from the second reference array with the second on-press array to produce the second data as a second quotient array;

an inverse transform circuit disposed to transform the data in the quotient arrays to data referenced to a spatial domain;

a maximum value determining circuit which determines the maximum values in the first and second quotient arrays; and a comparison circuit which compares the positions of the maximum values relative to the first and second quotient arrays to determine the registration offset between the colors.

5. The system of claim 4, wherein the transform circuit is a fast Fourier transform circuit and the inverse transform circuit is an inverse fast Fourier transform circuit.

6. The system of claim 5, wherein the data referenced in the spatial domain are dot images.

7. The system of claim 1, wherein the reference and on-press arrays are N×M arrays, the N dimension of each array is associated with the X axis, the M dimension of each array is associated with the Y axis, and the processing circuit further comprises:

a correlation circuit which phase correlates the first reference array with the first on-press array to produce the first data as a first quotient array, and phase correlates the second reference array with the second on-press array to produce the second data as a second quotient array;

a maximum value determining circuit which determines the Nmax and Mmax locations of the maximum values in the first and second quotient arrays, determines adjacent values at ± n locations about the Nmax and Mmax locations, fits curves to the Nmax and adjacent values, and the Mmax and adjacent values, and determines the peaks of the curves in reference to Nmax and Mmax along the X and Y axes; and a comparison circuit which compares the positions of the peaks to determine the registration offset between the colors along the X and Y axes.

8. The system of claim 1 wherein the first reference array and the second reference array are reference images.

9. The system of claim 1 wherein the first reference array and the second reference array are generated by a sequential ink turn-on circuit.

10. The system of claim 1 wherein the first reference array has first borders and the second reference array has second borders and pixels on the first and second borders are replaced by system-generated border pixels.

11. The system of claim 10 wherein the system-generated border pixels are pseudo-random noise pixels.

12. The system of claim 11 wherein the pseudo-random noise pixels for the first borders have the same average amplitude of the average amplitude of the first color of the portion of the image.

13. The system of claim 1 wherein the imaging device is a 4-CCD camera.

14. The system of claim 13 wherein the 4-CCD camera includes trim filters.

15. The system of claim 1 wherein the imaging device is a 3-CCD camera.

16. The system of claim 4, further comprising a circuit which cross correlates the transformed pixel values of the first reference array with the first on-press array to produce a first product array, and cross correlates the transformed pixel values of the second reference array with the second on-press array to produce a second product array.

17. The system of claim 16, wherein the pixel values include the eight neighboring pixels to the pixel having a maximum value.

18. The system of claim 17, wherein the comparison circuit employs curve fitting on the maximum product values to determine the registration offset.

19. The system of claim 18, wherein the comparison circuit compares the position of the maximum value of the first quotient array with the maximum value of the second quotient array to determine the registration offset between the first color and the second color.

20. The system of claim 16, wherein the comparison circuit employs a blur function to determine the registration offset.

21. A system for generating signals representative of color registration offsets between cyan, magenta, yellow and black inks of a printed image, wherein first, second, third and fourth printing units are disposed to print cyan, magenta, yellow and black ink on a web, the system comprising:

a memory which stores first, second, third and fourth reference arrays of digital data representative of the cyan, magenta, yellow and black inks in at least a portion of a printed image, respectively;

an imaging device in optical communication with the web to produce first, second, third and fourth analog signals representative of the cyan, magenta, yellow and black inks, respectively, in the portion of the image;

a converter circuit, operatively associated with the memory and the imaging device, which converts the first, second, third and fourth analog signals to cyan, magenta, yellow and black data arrays of digital on-press data respectively, wherein the cyan, magenta, yellow and black data arrays are representative of the cyan, magenta, yellow and black inks, respectively; and a processing circuit in communication with the converter circuit and the memory, wherein the processing circuit phase correlates the cyan, magenta, yellow and black reference arrays with the cyan, magenta, yellow and black on-press arrays, respectively, when determining registration offsets between the cyan, magenta, yellow and black inks.

22. The system of claim 21, wherein the processing circuit further comprises:

a transform circuit disposed to transform the data in the reference arrays and the on-press arrays to data referenced to a frequency domain;

a correlation circuit which phase correlates the transformed data from the cyan, magenta, yellow and black reference arrays with the on-press arrays, respectively, to produce cyan, magenta, yellow and black quotient arrays;

an inverse transform circuit disposed to transform the quotient arrays to dot arrays referenced to a spatial domain;

a maximum value determining circuit which determines a plurality of maximum values in the dot arrays; and a comparison circuit which compares the positions of the maximum values of three of the dot arrays with one of the dot arrays to determine the registration offset between the cyan, magenta, yellow and black inks as referenced to one of the inks.

23. The system of claim 22, wherein the transform circuit is a fast Fourier transform circuit and the inverse transform circuit is an inverse fast Fourier transform circuit.

24. A system for generating a signal representative of color registration offset between at least first and second colors of an image printed on a web, wherein a first printing unit prints the first color of the image and a second printing unit prints the second color of the image, the system comprising:

memory means for storing a first reference array of digital data representative of the first color in at least a portion of the image and a second reference array of digital data representative of the second color of the portion of the image;

imaging means in optical communication with the web for producing a first analog signal representative of the first color of the portion of the image and a second analog signal representative of the second color of the portion of the image;

a converter means operatively associated with the imaging means and the memory means for converting the first analog signal to a first color array of digital on-press data, converting the second analog signal to a second color array of digital on-press data, and storing the first and second on-press arrays; and a processing means in communication with the converter means and the memory means, wherein the processing means phase correlates the first reference array with the first on-press array to produce first data and phase correlates the second reference array with the second on-press array to produce second data, the processing means comparing the first data and the second data to determine a registration offset between the first and second colors and producing a signal representative of the registration offset between the first color and the second color.

25. The system of claim 24, wherein the processing means further comprises density conversion means which converts the first color array of digital data into a first on-press array of digital data representative of the color density of the first color and converts the second color array of digital data into a second density array of digital on-press data representative of the color density of the second color.

26. The system of claim 24, wherein the processing means further comprises:

correlation means for phase correlating the first reference array with the first on-press array to produce a first quotient array, and phase correlates the second reference array with the second on-press array to produce a second quotient array;

maximum value determining means for determining a plurality of maximum values in the first and second quotient arrays; and comparison means for comparing the positions of the maximum values relative to the first and second quotient arrays to determine the registration offset between the colors.

27. The system of claim 24, wherein the processing means further comprises:

transform means for transforming the data in the first and the second reference arrays, a third reference array of digital data representative of a third color in at least a portion of the image, the first and the second on-press arrays, and a third color array of digital on-press data to data referenced to a frequency domain;

correlation means for phase correlating the transformed data from the first reference array with the first on-press array to produce a first quotient array, phase correlating transformed data from the second reference array with the second on-press array to produce a second quotient array, and phase correlating transformed data from the third reference array with the third on-press array to produce a third quotient array;

inverse transform means for transforming the data in the first, the second and the third quotient arrays to data referenced to a spatial domain;

maximum value determining means for determining a plurality of maximum values in the first, the second and the third quotient arrays; and comparison means for comparing the positions of the maximum values relative to the first, the second and the third quotient arrays to determine the registration offset between the colors.

28. A system for generating a signal representative of color registration rotational offset between at least first and second colors of an image printed on a web, wherein a first printing unit prints the first color of the image and a second printing unit prints the second color of the image, the system comprising:

a memory disposed to store a first reference array of digital data representative of the first color of at least first and second portions of the image and a second reference array of digital data representative of the second color of the first and second portions of the image, wherein the first portion is displaced from the second portion;

an imaging device in optical communication with the web to produce a first analog signal representative of the first color of the portions of the image and a second analog signal representative of the second color of the portions of the image;

a converter circuit, operatively associated with the imaging device and the memory, which converts the first analog signal to a first color array of digital on-press data, and converts the second analog signal to a second color array of digital on-press data, wherein the first and second color arrays of on-press data are stored in the memory; and a processing circuit in communication with the converter circuit and the memory, wherein the processing circuit phase correlates the first reference array with the first on-press array to produce first data and phase correlates the second reference array with the second on-press array to produce second data, the processing circuit comparing the first data and the second data to determine a registration offset between the first and second colors at the first and second portions, and producing a signal representative the skew offset between the colors based upon the registration offset between the first and second colors.

29. The system of claim 28, wherein the processing circuit further comprises a density conversion circuit which converts the first color array of digital on-press data into a first density array of digital data representative of the color density of the first color and converts the second color array of digital on-press data into a second density array of digital data representative of the color density of the second color.

30. The system of claim 29, wherein the processing circuit further comprises:

a transform circuit disposed to transform the data in the reference arrays and the on-press arrays to data referenced to a frequency domain;

a correlation circuit which phase correlates the transformed data from the first reference array with the first on-press array to produce a first quotient array, and phase correlates the transformed data from the second reference array with the second on-press array to produce a second quotient array;

an inverse transform circuit disposed to transform the data in the first and second quotient arrays to data referenced to a spatial domain;

a maximum value determining circuit which determines the maximum values in the first and second quotient arrays; and a comparison circuit which compares the positions of the maximum values relative to the first and second quotient arrays to determine the registration offset between the colors at the first and second portions of the image.

31. The system of claim 30, wherein the correlation circuit cross correlates the transformed pixel values of the first reference array with the first on-press array to produce a first product array, and cross correlates the transformed pixel values of the second reference array with the second on-press array to produce a second product array.

32. The system of claim 31, wherein the pixel values include the eight neighboring pixel values having a maximum value.

33. The system of claim 31, wherein the comparison circuit employs curve fitting on the maximum product values to determine the registration offset.

34. The system of claim 30, wherein the transform circuit is a fast Fourier transform circuit and the inverse transform circuit is an inverse fast Fourier transform circuit.

35. The system of claim 28, wherein the imaging device is a 4-CCD camera.

36. The system of claim 28, wherein the imaging device is a 3-CCD camera.

37. The system of claim 31, wherein the comparison circuit employs a blur function to determine the registration offset.

38. A method of generating a first reference array of first digital data representative of a first color and a second reference array of second digital data representative of a second color for use in a registration control system of a printing apparatus, the printing apparatus printing an image on at least a portion of a web, the method comprising the steps of:

(A) applying ink of a first color to the web;

(B) optically communicating with web after said step (A) to generate a first signal representative of the ink of the first color on the web;

(C) converting the first signal after said step (B) to generate a first reference array representative of the first ink of the first color on the web;

(D) applying ink of a second color to the web after said step (C);

(E) optically communicating with the web after said step (D) to generate a second signal representative of the ink of the second color on the web;

(F) converting the second signal after said step (E) to generate a second reference array representative of the second ink of the second color on the web; and (G) storing the first and the second reference arrays in a memory.

39. The method of claim 38 further comprising the steps of:

(H) applying ink of a third color to the web after said step (E);

(I) optically communicating with the web after said step (H) to generate a third signal representative of the ink of the third color on the web;

(J) converting the third signal after said step (I) to generate a third reference array representative of the third ink of the third color on the web; and (K) storing the third reference array in the memory.

40. The method of claim 39 further comprising the steps of:

(L) applying ink of a fourth color to the web after said step (I);

(M) optically communicating with the web after said step (L) to generate a fourth signal representative of the ink of the fourth color on the web;

(N) converting the fourth signal to generate a fourth reference array representative of the fourth ink of the fourth color on the web; and (O) storing the fourth reference array in the memory.

41. The method of claim 40, wherein the first color is yellow, the second color is magenta, the third color is cyan, and the fourth color is black.

42. The method of claim 38, wherein the steps of optically communicating are performed by a camera assembly which includes at least two channels, the first signal being generated by a first channel, and the second signal being generated by a second channel.

43. The method of claim 40, wherein the steps of optically communicating are performed by a camera assembly having a blue channel, a green channel, a red channel, and an infrared channel wherein the first signal is generated by the blue channel, the second signal is generated by the green channel, the third signal is generated by the red channel, and the fourth signal is generated by the infrared channel.

44. The method of claim 43, wherein the camera assembly is a 4-CCD camera.

45. The method of claim 44, wherein the 4-CCD camera includes trim filters.

46. The method of claim 43 wherein the camera assembly is a 3-CCD camera.

47. The method of claim 38, further comprising the step of replacing border pixels in the first and the second reference arrays with pseudo-random noise pixels.

48. The method of claim 38, further comprising the step of performing cross correlation to determine a plurality of peak pixel values to generate register offset data representative of original color-to-color misregistration.

49. A system for generating a first reference array of first digital data and a second reference array of second digital data for use in a registration control system of a printing apparatus, the printing apparatus printing an image on at least a portion of a web, the printing apparatus including a first printing unit which prints a first color of the image on the portion of the web and a second printing unit which prints a second color of the image on the portion of the web, the system comprising:

means for printing sequential ink reference images on the web and for producing reference data arrays from the reference images, the means for printing sequential ink reference images including a print controller coupled to the first printing unit and the second printing unit, the print controller configured to have the first print unit apply the first color to the web, and the second print unit apply the second color to the web, a memory disposed to store the first reference array of digital data representative of the first color of at least a reference area of the image and a second reference array of digital data representative of the second color of the reference area, an imaging system, in optical communication with the web, the imaging system being configured to produce a first analog signal representative of the first color of the reference area of the image and a second analog signal representative of the second color of the reference area of the image, and a converter circuit, operatively associated with the imaging device and the memory, which converts the first analog signal to the first reference array of digital data, and converts the second analog signal to the second reference array of digital data; and a processor configured to perform cross correlation on the first reference array and the second reference array to generate register offset data representative of original color-to-color misregistration.

50. The system of claim 49, wherein the imaging system is a 4-CCD camera.

51. The system of claim 49, wherein the imaging system is a 3-CCD camera.

52. A system for generating a cyan reference array, a magenta reference array, a yellow reference array, and a black reference array for a printed image, wherein a cyan printing unit, a magenta printing unit, a yellow printing unit, and a black printing unit are disposed to print cyan, magenta, yellow and black ink, respectively, on a web, the system comprising;

a print controller coupled to the printing units, the print controller configured to have the printing units first print a first reference area of the image in yellow ink, next print a second reference area of the image in magenta ink, next print a third reference area of the image in cyan ink, and next print a fourth reference area in black ink;

a memory configured to store the yellow, magenta, cyan, and black reference arrays of digital data representative of the yellow ink, the magenta ink, the cyan ink, and the black ink, respectively, in the first reference area, the second reference area, the third reference area, and the fourth reference area;

a camera assembly in optical communication with the web, the camera assembly further comprising an imaging system configured to produce in order first, second, third and fourth analog signals representative of the yellow, magenta, cyan and black reference areas, respectively, of the image; and a converter circuit, operatively associated with the imaging device and the memory, which converts the first analog signal to the yellow reference array of digital data, converts the second analog signal to the magenta reference array of digital data, converts the third analog signal to the cyan reference array of digital data, and converts the fourth analog signal to the black reference array of digital data.

53. The system of claim 52, further comprising a processing circuit in communication with the memory, wherein the processing circuit compares the cyan, magenta, yellow and black reference arrays to determine registration offsets between the cyan, magenta, yellow, and black reference arrays.

54. The system of claim 53, wherein the processing circuit employs cross correlation to determine the registration offsets.

55. The system of claim 53, wherein the processing circuit employs phase correlation to determine the registration offsets.

56. The system of claim 53, wherein the processing circuit applies pseudo-random noise to the borders of the yellow, magenta, cyan and black reference arrays.

57. The system of claim 52, wherein the camera assembly is a 4-CCD camera.

58. The system of claim 52, wherein the camera assembly is a 3-CCD camera.

59. A system for generating a signal representative of color registration offset between at least first and second colors of an image printed on a web, where a first printing unit prints the first color of the image and a second printing unit prints the second color of the image, the system comprising:

an imaging device in optical communication with the web to produce a first analog signal representative of the first color of the portion of the image and a second analog signal representative of the second color of the portion;

a memory for storing digital data;

a converter circuit, operatively associated with the imaging device and memory, which converts the first analog signal to a first color array of digital data, and converts the second analog signal to a second color array of digital data, where the first and second color arrays are stored in said memory;

a transform circuit disposed to transform the data in the color arrays to data referenced to a frequency domain;

a correlation circuit which correlates the transformed data from the first color array with the transformed data from the second color array to produce a product array;

an inverse transform circuit disposed to transform the data in the product array to a spatial array having data referenced to a spatial domain;

a maximum value determining circuit which determines the maximum value in the spatial array to determine a registration offset between the first and second colors and produces a signal representative of the registration offset between the colors.

60. The system of claim 59 wherein the transform circuit is a fast Fourier transform circuit and the inverse transform circuit is an inverse fast Fourier transform circuit.

61. The system of claim 59 wherein the first and second color arrays are N×M arrays, the N dimension of each array is associated with the X axis, the M dimension of each array is associated with the Y axis, and wherein the maximum value determining circuit determines the Nmax and Mmax locations of the maximum values in the spatial array, determines adjacent values at ± n locations about the Nmax and Mmax location, fits curves to the Nmax and adjacent values, and the Mmax and adjacent values, and determines the peaks of the curves in reference to Nmax and Mmax in terms of units along the X and Y axes, and determines the registration offset between the colors in terms of units along the X and Y axes.

* * * * *